United States Patent [19]

Ibar

[11] Patent Number: 5,605,707
[45] Date of Patent: Feb. 25, 1997

[54] MOLDING APPARATUS AND A METHOD OF USING THE SAME

[75] Inventor: Jean-Pierre Ibar, New Canaan, Conn.

[73] Assignee: Thermold Partners L.P., Stamford, Conn.

[21] Appl. No.: 476,947

[22] Filed: Jun. 7, 1995

Related U.S. Application Data

[62] Division of Ser. No. 138,673, Oct. 18, 1993, abandoned.

[51] Int. Cl.$^6$ ..................................................... B29C 45/78
[52] U.S. Cl. ........................ 425/144; 425/149; 425/557; 425/558; 425/560
[58] Field of Search ................................... 425/144, 149, 425/557, 558, 559, 560, 561, 563

[56] References Cited

U.S. PATENT DOCUMENTS

| | | |
|---|---|---|
| 2,575,162 | 11/1951 | Sternberg . |
| 2,686,934 | 8/1954 | D'Amore . |
| 3,054,143 | 9/1962 | Stenger . |
| 3,103,729 | 9/1963 | Flamand . |
| 3,158,901 | 12/1964 | Westover . |
| 3,162,703 | 12/1964 | Eyles . |
| 3,191,234 | 6/1965 | Hendry . |
| 3,375,553 | 3/1966 | Criss . |
| 3,483,288 | 12/1969 | Paulson . |
| 3,523,147 | 8/1970 | Hold et al. . |
| 3,616,495 | 11/1971 | Lemelson . |
| 3,646,990 | 3/1972 | Cross . |
| 3,819,313 | 6/1974 | Josephsen et al. . |

(List continued on next page.)

FOREIGN PATENT DOCUMENTS

| | | |
|---|---|---|
| 0339184 | 11/1989 | European Pat. Off. . |
| 0419911 | 4/1991 | European Pat. Off. . |
| 0424624 | 5/1991 | European Pat. Off. . |
| 0467129 | 1/1992 | European Pat. Off. . |
| 2513594 | 10/1976 | Germany . |
| 351715 | 9/1972 | U.S.S.R. . |
| 398395 | 2/1974 | U.S.S.R. . |
| 1350017 | 11/1987 | U.S.S.R. . |
| 1463687 | 2/1977 | United Kingdom . |
| 2008023 | 5/1979 | United Kingdom . |

OTHER PUBLICATIONS

Ibar, J. P., "Instability in the Rubbery State Revealed by D.S.C. of Rheomolded® Polystyrene Samples", *Polymer Communications*, vol. 24, pp. 331–335 (Nov. 1983).

Ibar, J. P., "Rheomolding: A New Process to Mold Polymeric Materials" *Polym.–Plast. Technol. Eng.*, vol. 17, No. 1, pp. 11–44 (1981).

*Shock and Vibration Handbook*, 2d, Ed. C. M. Harris and C. E. Crede, pp. 33(6)–33(7) (1976).

*Plastics Mold Engineering*, Rev. Ed., ed. J. H. DuBois and W. I. Pribble, pp. 438–451 (1966).

(List continued on next page.)

*Primary Examiner*—Tim Heitbrink
*Attorney, Agent, or Firm*—Seidel, Gonda, Lavorgna & Monaco PC.

[57] ABSTRACT

The invention pertains to an apparatus and method of using the same. This apparatus includes a mold defining a mold cavity and an inlet through which molten material can pass. Also included is at least one feeder for preparing a molten material. This feeder has an outlet through which molten material can pass. There is also at least one accumulator spaced from the feeder and the mold. This accumulator has an inlet through which molten material can enter, and an outlet through which molten material pass. The accumulator also is designed such that it can introduce a molten material through its outlet into the mold cavity and exert a shear stress, compressive force or stress tensor on the molten material contained within the accumulator and/or within the mold cavity. The apparatus also includes a flow control mechanism is designed to prevent the flow of molten material from the accumulator back into the feeder. Also included is a device for controlling and monitoring the temperature of any molten, material contained within the accumulator and/or within the mold.

7 Claims, 16 Drawing Sheets

U.S. PATENT DOCUMENTS

| | | |
|---|---|---|
| 3,833,694 | 9/1974 | Hughes . |
| 3,847,525 | 11/1974 | Bielfeldt et al. . |
| 3,975,128 | 8/1976 | Schlüter . |
| 3,996,330 | 12/1976 | Jones et al. . |
| 4,014,969 | 3/1977 | Gorter et al. . |
| 4,029,454 | 6/1977 | Monnet . |
| 4,120,922 | 10/1978 | Lemelson . |
| 4,124,308 | 11/1978 | Sokolow . |
| 4,210,616 | 7/1980 | Eckardt et al. . |
| 4,288,398 | 9/1981 | Lemelson . |
| 4,314,963 | 2/1982 | Boden et al. . |
| 4,315,726 | 2/1982 | Semerdjiev et al. . |
| 4,386,902 | 6/1983 | Carlstein et al. . |
| 4,442,070 | 4/1984 | Proksa et al. . |
| 4,469,649 | 9/1984 | Ibar . |
| 4,473,516 | 9/1984 | Hunerberg . |
| 4,542,054 | 9/1985 | Fillmann . |
| 4,678,427 | 7/1987 | Fritzsche ............................ 425/565 |
| 4,720,364 | 1/1988 | Kauffmann et al. . |
| 4,722,679 | 2/1988 | Farrell . |
| 4,851,167 | 7/1989 | Marc . |
| 4,925,161 | 5/1990 | Allan et al. . |
| 5,011,399 | 4/1991 | Farrell ............................... 425/563 |
| 5,043,129 | 8/1991 | Sorensen . |
| 5,059,368 | 10/1991 | Allan et al. . |
| 5,069,840 | 12/1991 | Arnott . |
| 5,132,549 | 7/1992 | Allan et al. . |
| 5,156,858 | 10/1992 | Allan et al. . |
| 5,160,466 | 11/1992 | Allan et al. . |
| 5,192,555 | 3/1993 | Arnott . |
| 5,213,732 | 5/1993 | Jevtic . |
| 5,427,516 | 6/1995 | Bader et al. ....................... 425/149 |
| 5,486,105 | 1/1996 | Katsumata ......................... 425/144 |

OTHER PUBLICATIONS

Menges, G., et al., "'Self–Reinforcing' Plastics: A New Approach to High–Performance Resins", *Modern Plastics International*, pp. 38–39 (Oct. 1981).

Allan, P., et al., "Producing Void–Free Thick–Section Thermoplastic and Fibre Reinforced Thermoplastic Mouldings", *Plastics & Rubber International*, vol. 9, No. 2, pp. 33–37 (Apr. 1984).

Allan, P. S., et al., "The Effect of Oscillating Packing Pressures on the Residual Stresses in Thick–Section Polyethylene Injection Mouldings", *Plastics and Rubber Processing and Applications*, vol. 5, No. 1, pp. 71–78 (1985).

Allan, P. S., et al., "Development and Application of Multiple Live–Feed Moulding for the Management of Fibres in Moulded Parts", *Composites Manufacturing*, vol. 1, No. 2, pp. 79–84 (Jun. 1990).

Allan, P. S., et al., "Multiple Live–Feed Injection Moulding", *Plastics and Rubber Processing and Applications*, vol. 7, No. 1, pp. 3–10 (1987).

Gibson, J. R., et al., "The Multiple Live–Feed Moulding of DMCs", *Composites Manufacturing*, vol. 1, No. 3, pp. 183–190 (Sep. 1990).

Allan, P. S., et al., *"Shear Controlled Orientation in Extrusion"*, Wolfson Centre for Materials Processing, Brunel University, Uxbridge, Middlesex UB8 3PH, UK, pp. 1–9.

Cavic, M., et al., "Precision Moulding of Short Glass Fibre Reinforced Polypropylene Rings", Wolfson Centre for Materials Processing, Brunel University, Uxbridge, Middlesex UB8 3PH, UK.

Gibson, J. R., et al., "Recent Developments in Shear Controlled Orientation of Reinforcement in Polymer Matrix Mouldings", Wolfson Centre for Materials Processing, Brunel University, Uxbridge, Middlesex, pp. 1–6.

*Ultra–High Modulus Polymers*, ed. A. Ciferri and I. M. Ward, pp. 325–333.

Rueda, D. R., et al., "X–Ray Diffraction Study of Die Drawn Poly(Aryletherketone) (PEEK)", *Polymer Communications*, vol. 24, p. 258 (Sep. 1983).

*The Scorim™ Process For Injection Molding*, Scortec Inc., Gulph Mills, PA, Product Brochure (Aug. 1991).

*Eureka*, "Shearing Pistons Treble Strength of Injection Mouldings", p. 21 (Mar. 1991).

Frados, Joel, *Plastics Engineering Handbook* 4th edition, 1976, pp. 90–93.

Multiple live–feed processing as a route for fibre management in composite materials, P. S. Allan and M. J. Beavis, Series No. III, International Conference on New Materials and their Applications, University of Warwick, 1990.

MOLDING APPARATUS AND A METHOD OF USING THE SAME

CROSS-REFERENCE TO RELATED APPLICATIONS

This application is a divisional of U.S. patent application Ser. No. 08/138,673, filed Oct. 18, 1993 abandoned.

FIELD OF THE INVENTION

This invention pertains to an apparatus for molding and modifying the physical properties of polymeric materials. The invention also pertains to methods of using such apparatuses.

BACKGROUND OF THE INVENTION

It is well known to those skilled in molding polymeric materials that slight modifications of processing parameters (e.g., temperatures, pressures, flow rates, etc.) often result in a modification of the final product's physical properties. Since slight modifications are common place in most commercial molding processes, skilled artisans find it difficult, if even possible, to accurately predict the physical properties of the resulting molded product.

One accepted practice which is designed to compensate for this lack of control includes increasing the thickness of the part being molded. Although this decreases the effect of slight modifications in processing parameters, it increases the cost per molded unit. Moreover, this practice cannot be used in those instances wherein the final molded product has to be very small and/or thin.

In view of the above, the polymer molding industry would greatly welcome a molding apparatus and/or molding method which Increases the level of control over the product's physical properties without being dependent upon its size, shape or thickness. Moreover, it would be an even more welcomed improvement if such a molding apparatus and/or method would not result in significantly increasing the cost per molded unit, unnecessarily.

SUMMARY OF THE INVENTION

Accordingly, one object of this invention is to provide a molding apparatus and/or method which imparts quality control for the final product in terms of dimensions, stability, homogeneity and weight.

Another object of this invention is to provide a molding apparatus and/or method which can consistently modify the physical properties of the molded unit.

These and other objects are achieved through the advent of a novel molding apparatus and/or a method of using the same. The novel apparatus includes, among other things, a mold which defines a mold cavity therein. This mold has an inlet through which a molten, moldable material can pass into and/or through the mold cavity.

The apparatus also includes at least one feeder for preparing a molten, moldable material. This feeder is spaced from the mold. The feeder includes a means for expelling the molten, moldable material through its outlet.

Also included in this apparatus is at least one accumulator spaced from the feeder and the mold. This accumulator has a cavity defined therein. Moreover, this accumulator has an inlet conduit through which molten, moldable material can pass into the accumulator cavity, and an outlet conduit through which molten, moldable material can pass out from the accumulator cavity.

The accumulator includes a means for expelling the molten, moldable material through its outlet. The accumulator also includes a means for exerting a shear stress, a compressive force and/or a stress tensor on the molten, moldable material contained within its captivity. This pressure exertion means can also subject the molten, moldable material contained within and/or passing through the mold cavity to a shear stress, a compressive force and/or a stress tensor.

Also included in the apparatus is a flow control means for preventing the flow of molten, moldable material from the accumulator(s) cavity back into the feeder(s) when the accumulator(s) pressure exertion means is exerting a shear stress, compressive force and/or stress tensor on the molten, moldable material contained within its cavity and/or within or passing through the mold cavity.

The flow control means is positioned within a manifold which is interposed between the feeder(s), the accumulator(s) and the mold. This manifold has flow channels therethrough which correspond with the feeder(s) outlet, the accumulator(s) inlet and outlet, and the mold inlet.

The apparatus also includes a means for controlling the temperature of the material contained within the feeder(s), the accumulator(s) and/or the mold.

Other objects, aspects and advantages of the present invention will be apparent to those skilled in the art upon reading the specification and the appended claims which follow.

A more complete appreciation of the present invention, and many of the attendant advantages thereof, will be readily ascertained as the invention becomes better understood by reference to the following detailed description, when considered in connection with the accompanying figures briefly described below.

DEFINITIONS

Figure 1:
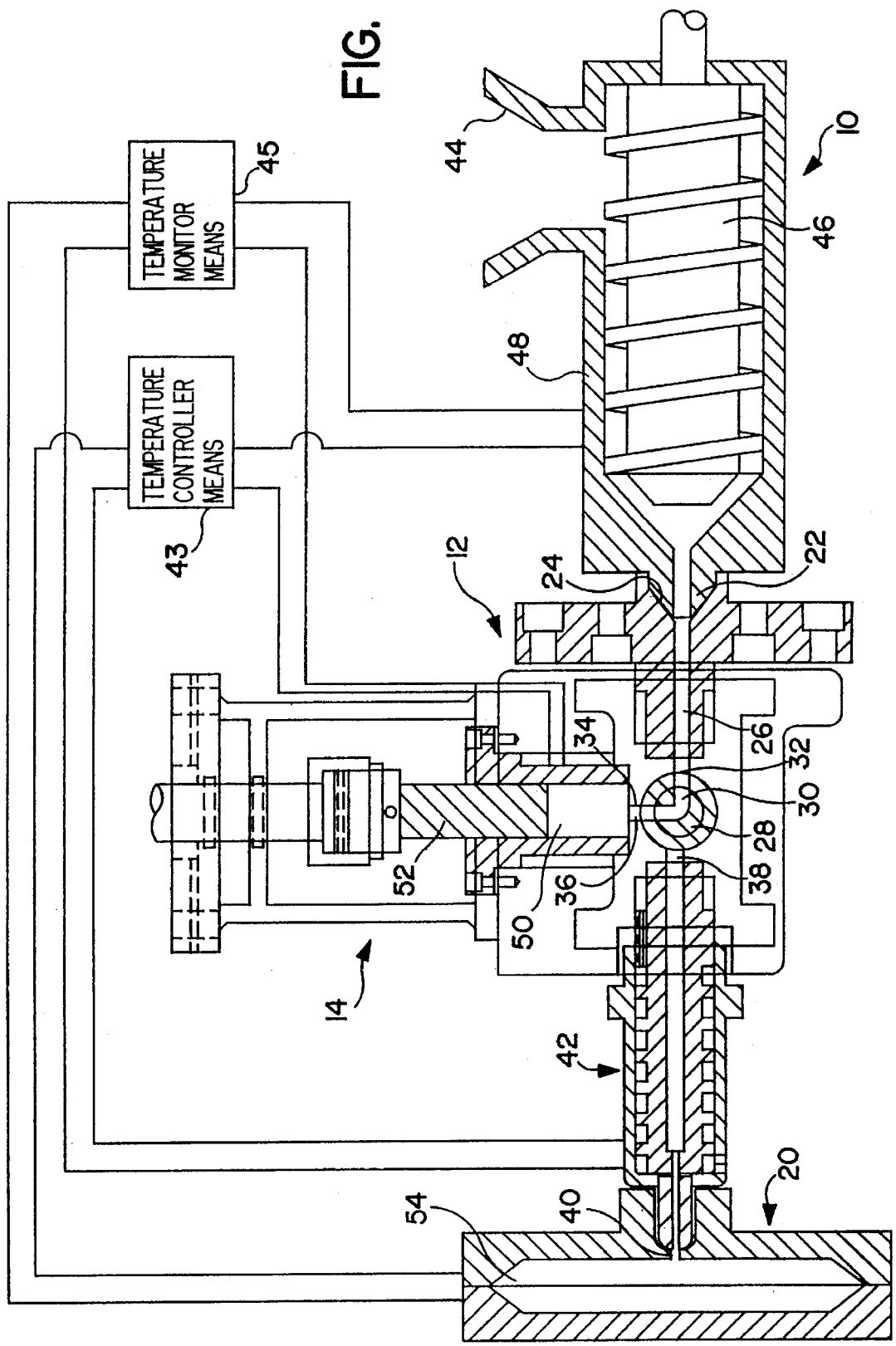
FIG. 1 is a schematic illustration of one embodiment of a molding apparatus designed in accordance with the present invention having a single feeder and a single accumulator, wherein the flow control means comprises one specific design of a rotatable valving mechanism.

As used herein, the term "stress tensor" refers to a matrix which is composed of two types of stress-based components—a compressive force and a shear stress.

Other terms and phrases will be defined throughout the text of this specification.

DETAILED DESCRIPTION OF THE INVENTION

The present invention pertains to apparatuses for molding and modifying the physical properties of moldable materials (e.g., polymers). It also pertains to methods of using such apparatuses.

The apparatus encompassed by the present invention includes a mold which defines a mold cavity. This mold has an inlet through which a molten, moldable material can pass into or through the mold cavity.

The apparatus is not limited to any specific mold design or configuration. For example, the mold can be a closed mold having at least one inlet through which molten, moldable material can enter into the mold cavity. On the other hand, the mold can be a die which also has at least one inlet through which molten, moldable material can pass. The inlet through which the molten moldable material enters into the mold cavity or passes through the die is generally comprised of at least one relatively small channel (e.g., "gate", "runner", "sprue", etc.).

Upon reading this specification, those skilled In the art will know what types of molds and/or mold inlet systems can be used when practicing the invention. The preferred mold and/or mold inlet system will depend, in part, upon the product being manufactured and the resources available to the manufacturer.

The apparatus also includes at least one feeder for preparing a molten, moldable material. The feeder is spaced from the mold and any other feeder which may be present.

The feeder includes a means for expelling the molten, moldable material through its outlet. This expelling action can be accomplished by any suitable means known to those skilled in the art. Some examples of feeders which include such an expelling means include, without limitation, injection screws as used in injection molding apparatuses, twin screws as used with blends, plungers as used in transfer molding apparatuses, and the like. Under certain circumstances, the feeder can be designed to exert a stress tensor on the molten, moldable material.

It is also within the scope of this invention for the apparatus to include a plurality of feeders. If a plurality of feeders are employed, the molten, moldable material prepared in each need not be the same. For example, each feeder can contain the same material. They can also contain the same material but at a different temperature. This changes the densities, fluidities and/or melt flow rates of the material. The separate feeders can also contain materials which are virgin in one and recycled in another. Moreover, the individual feeders can contain completely different materials or materials which are filled or untitled with fibers, fillers, different concentration of blends, pigments, antioxidants, flame retardant compounds, and the like, and/or any combination thereof. The second feed can be introduced into the system at a second stage of processing for economical reasons to decrease the price of the compound coming in the core of the system (i.e., compare the price of the envelope created by the first feed) or for material performance reasons if the core of the pan is not subjected to stresses which are as strong as those subjected onto the skin.

As indicated above, the concept of using a plurality of feeders is instrumental when one feeder contains a virgin material while the other contains a recycled material. Under these circumstances, the virgin material is first introduced into the mold. Before the whole molded part is hardened, the recycled material is introduced into the mold. Such a process significantly reduces manufacturing costs while maintaining the desired appearance level, and reduces the level of contamination of the core of the molded part from the air which is in contact with the outside skin. This is particularly useful in the case of recycled material for beverage molded articles or for medical applications.

After reading this specification, those skilled in the art will know what types of feeders can be used when practicing the invention. The preferred feeder design, number, and injection parameters will depend, in part, upon the product being manufactured, the resources of the manufacturer, and the mold being employed.

Also included in this apparatus is at least one accumulator. This accumulator is spaced from the mold, the feeder(s) and any other accumulator which may be present.

This accumulator has at least one inlet conduit through which molten, moldable material can enter, and at least one outlet conduit through which molten, moldable material can exit. It is within the scope of this invention for the inlet conduit and the outlet conduit to be the same channel through which molten, moldable material passes to and from the accumulator.

The accumulator includes a means for expelling the molten, moldable material through its outlet. This expelling action can be accomplished by any suitable means known to those skilled in the art. Some examples of accumulators which include such a means are, without limitation, injection screws as used in injection molding apparatuses, plungers as used in transfer molding apparatuses, and the like.

The accumulator also includes a means for exerting a shear stress, a compressive force and/or a stress tensor on the molten, moldable material contained within its cavity and/or within or passing through the mold cavity. This can be accomplished by any suitable pressure exertion means known to those skilled in the art after reading this specification. For example, this is accomplished by the implementation of a mechanical device (e.g., a reciprocating device), a dielectric device for dielectric materials or an electromagnetic device for metallic materials.

As used herein, the term "reciprocating device" refers to a device which includes, among other things, at least one drivable member which is reciprocable within, and relative to, at least one chamber. The chamber of the reciprocating device can be separate from, but in fluid communication with, the accumulator. However, it is also within the purview of this invention for the reciprocating device and the accumulator to be the same unit (see, e.g., FIG. 1–13).

Accordingly, in one preferred embodiment, the accumulator not only feeds the molten, moldable material into the mold, but also exerts a compressive force, shear stress and/or stress tensor onto the material prior to and/or during its passage from the accumulator cavity into the mold cavity, as well as while it is within and/or passing through the mold cavity. This manipulation of the moldable material can be performed by reciprocating the drivable member of a reciprocating device in a predetermined manner.

The drivable member and its respective chamber can have any configuration which enables one to practice this invention. Examples of suitable configurations include, without limitation, oscillating pistons within corresponding cylinders, oscillating injection screws within corresponding cylinders, and the like, and/or any combination thereof.

This exertion of a shear stress, compressive force and/or stress tensor on the molten, moldable material contained within the accumulator(s) cavity and/or within the mold cavity can be performed in accordance with a predetermined program as set out in U.S. Pat. No. 4,469,649, which is incorporated herein by reference. This programmed pattern takes into consideration a specific reciprocation pattern and a specific temperature pattern.

The specific reciprocation pattern varies certain rheological parameters of the molten, moldable material contained within the accumulator(s) cavity and/or within the mold cavity with time to achieve an end product of prescribed physical and/or physicochemical characteristics. The rheological parameters which are varied, due to this specific reciprocation pattern, include mechanical vibration, shear stress, hydrostatic pressure, dielectric vibration for dielectric materials or electromagnetic vibration for metallic materials. For crystallizable materials, the rheological variables include mechanical vibration, shear stress, dielectric vibration for dielectric materials and electromagnetic vibration for metallic materials. For non-crystallizable materials, hydrostatic pressure is an additional rheological variable. Variations in vibration (e.g., mechanical, dielectric and/or electromagnetic) can either be by means of frequency or amplitude (i.e., intensity).

Varying such rheological parameters in accordance with a specific reciprocation pattern is referred to herein as the exertion of a compressive force, shear stress and/or stress tensor on a molten, moldable material.

It is within the scope of this invention for the apparatus to include a plurality of accumulators. If a plurality of accumulators are employed, the molten, moldable material in each accumulator need not be the same. For example, in such an embodiment, each accumulator can be connected to its own feeder. Under these circumstances, each feeder can feed into its corresponding accumulator the same material, the same material but at a different temperature thus altering the materials' densities, fluidities and/or melt flow rates, or materials which are completely different by composition and/or grade.

When practicing this invention, it is possible to having one feeder feed a particular molten, moldable material Into more than one accumulator either simultaneously or intermittently. On the other hand, it is possible to have more than one feeder feed molten, moldable material into one accumulator either simultaneously or intermittently. It is also possible to have more than one feeder feed molten, moldable material(s) into more than one accumulator either simultaneously or intermittently.

The apparatus also includes at least one manifold which is interposed between the feeder(s), the accumulator(s) and the mold. This manifold has openings positioned along its periphery which correspond to the number and location of the feeders, accumulators and molds employed in the apparatuses. These openings, in turn, correspond with flow channels passing therethrough. The manifold flow channels direct the flow of molten, moldable material from the feeder(s) to the accumulator(s) and/or the mold, and from the accumulator(s) to the mold.

The apparatus further includes a flow control means for preventing the flow of molten, moldable material from the accumulator(s) back into the feeder(s). This is especially applicable when the accumulator(s) pressure exertion means is exerting a shear stress, compressive force and/or stress tensor on the molten, moldable material contained within its cavity and/or within or passing through the mold cavity.

Any suitable flow control means can be employed when practicing this invention. Examples of suitable flow control means include, without limitation, rotatable valving mechanisms, slidable valving mechanisms, gate valve mechanisms, check valve mechanisms, and the like, and/or any combination thereof.

In one preferred embodiment, the flow control means comprises a valve which is movable from a first position to a second position (e.g., a rotatable valving mechanism or a slidable valving mechanism). This movable valve has flow channels therethrough such that, if interposed between at least one accumulator, at least one feeder and a mold: (a) the feeder's outlet is in fluid communication with the accumulator's inlet via the manifolds's flow channels, and that accumulator's outlet is not in fluid communication with the mold's inlet, when in its first position, (b) that accumulator's outlet is in fluid communication with the mold's inlet via the manifold's flow channels, and that accumulator's inlet is not in fluid communication with the feeder's outlet, when in its second position, and (c) neither the accumulator's inlet nor its outlet are in fluid communication with either the feeder's outlet or the mold's inlet when in an intermediate position, which is between its first and second positions.

Such a movable valve can move from its first position to its second position by any suitable means. For example, the valve can slide from its first position to its second position. Moreover, the valve can also rotate along a vertical plane or a horizontal plane. Examples of such rotatable valving mechanisms are illustrated in FIGS. 1–5, 8, 9, 12, 13 and 15 of this specification.

The preferred valve mechanism and the preferred method in which it can move depends, in part, upon the resources available to the manufacturer. Those skilled in the art will be able to select the mode which best suits their needs after reading this specification.

The configuration of the flow channels passing through such a movable valve and/or through the manifold depends in part upon the manner in which the valve will move, the number and positioning of the flow control means employed, the number and positioning of the feeders, the number and positioning of the accumulators, and the number and positioning of the molds. Examples of some suitable flow channel configurations are illustrated in FIG. 1–5, 8, 9, 12, 13 and 15 of this specification. Those skilled in the art will be able to select the configuration which best suits their needs after reading this specification.

In another preferred embodiment, the flow control means comprises a check valve mechanism which permits one-way passage of molten, moldable material therethrough. Such a check valve mechanism can be positioned at the outlet of the feeder(s) and/or the outlet of the accumulator(s). Similar check valve mechanisms can also be positioned at the inlet of accumulator(s) and/or the inlet of the mold.

Examples of embodiments of the present invention employing such check valve mechanisms are illustrated in FIGS. 5–11 and 15 of this specification. Notwithstanding these specific examples, any suitable check valve mechanism can be employed. Those skilled in the art will be able to select the check valve mechanism which best suits their needs after reading this specification.

Also included in this apparatus is a means for controlling the temperature of the material within the feeder(s), accumulator(s) and/or mold. Any suitable temperature controlling means can be employed when practicing this invention.

Examples of suitable temperature control means include, without limitation, the implementation of the following: (a) hot and cold oil circulated through passages in the injection machine, the accumulator, the injection nozzle and/or the mold, (b) resistance cartridges positioned within the injection machine, the accumulator, the injection nozzle and/or the mold, (c) hot pipes inserted into the injection machine, the accumulator, the injection nozzle, and the mold, and/or (d) fluid which is embedded in the injection machine, the accumulator, the injection nozzle and/or the mold and whose temperature can be controlled by dielectric means. Those skilled in the art will be able to select the temperature controlling means which best suits their needs after reading this specification.

Figure 14:
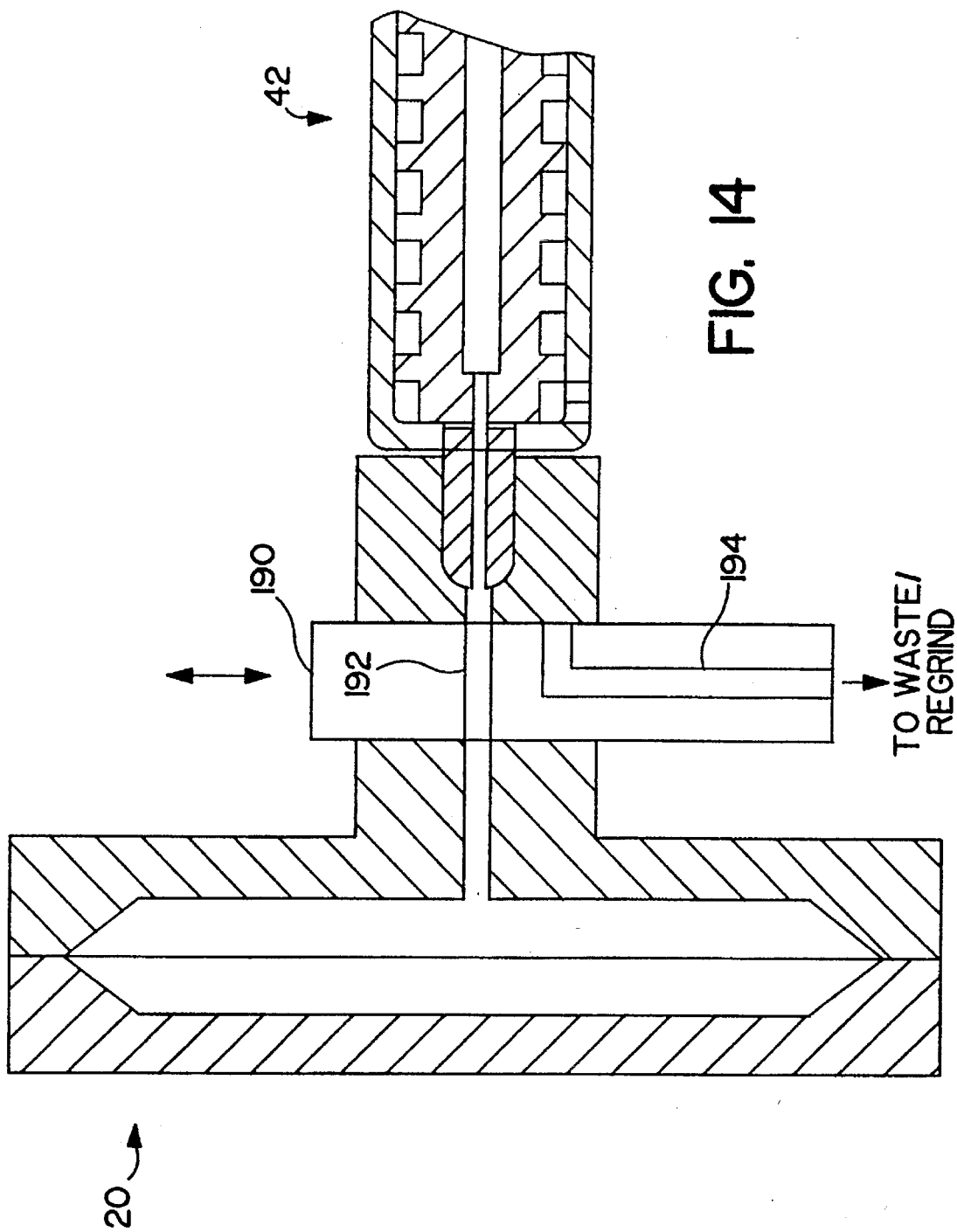
FIG. 14 Is a schematic Illustration of a purging mechanism interposed between an apparatuses' accumulator and mold.

In addition to the above, the apparatus can include many different optional features. For example, the apparatus can include a purge valve which can be positioned between the accumulator(s) and the mold and/or between the feeder(s) and the accumulator(s). One specific embodiment of such a purge valve is illustrated in FIG. 14 which will be discussed later in more detail.

Figure 15:
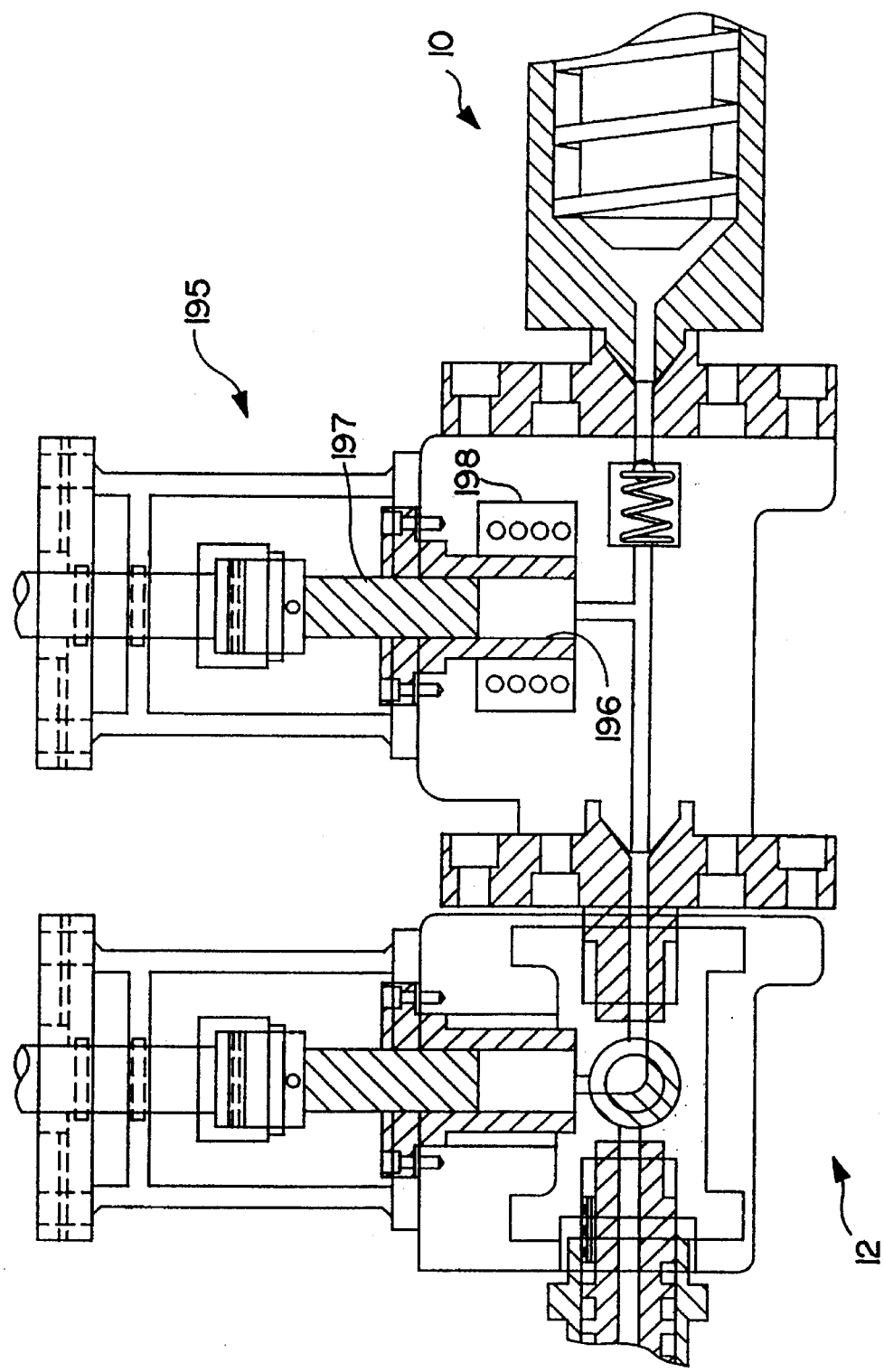
FIG. 15 is a schematic illustration of a holding chamber interposed between an apparatuses' feeder and accumulator.

Another optional feature which can be included in the present invention is a holding chamber positioned between the feeder(s) and the accumulator(s). This holding chamber can modify the temperature of the material. Thereafter, it can force this temperature-modified material into the accumulator(s) and/or the mold. Moreover, the holding chamber can also exert a compressive force, shear stress and/or stress tensor on the temperature-modified material contained therein and/or exiting therefrom. One specific embodiment of such an intermediate holding chamber is illustrated in FIG. 15 which will be identified in more detail later.

Specific embodiments of this invention are illustrated in FIG. 1–16. These illustrations are merely examples of manners in which to practice the invention. They are, in no way, intended to limit the scope of this invention.

Referring now to FIG. 1. FIG. 1 is a schematic illustration of one embodiment of a molding apparatus which is designed in accordance with the present invention. This molding apparatuses has a single feeder and a single accumulator. The flow control means therein comprises one specific design of a rotatable valving mechanism. Specifically, this molding apparatus includes feeder 10, manifold 12, accumulator 14 and mold 20. Manifold 12 is interposed between feeder 10, accumulator 14 and mold 20.

Feeder 10 has an outlet nozzle 22 through which molten, moldable material passes. Outlet nozzle 22 'is designed such that it corresponds to opening 24 defined in manifold 12. In turn, opening 24 corresponds to manifold flow channel 26 which leads to rotary valve 28.

Rotary valve 28 is the flow control means of this specific embodiment. Valve 28 can be rotated from a first position to a second position. This rotation can occur either along a horizontal plane or a vertical plane.

Rotary valve 28 has a flow channel 30 passing therethrough. This flow channel corresponds with openings 32 and 34 defined along the periphery of valve 28. When in the position illustrated in FIG. 1, valve opening 32 corresponds with manifold flow channel 26; and valve opening 34 corresponds with manifold flow channel 36.

Manifold 12 also has flow channel 38 defined therein. Manifold flow channel 38 leads to valve 28 and is in fluid communication with mold inlet 40.

When valve 28 is in its first position (i.e., the position illustrated in FIG. 1), feeder 10 is in fluid communication with accumulator 14 via manifold flow channels 26 and 36, and valve flow channel 30. It should be noted that, when valve 28 is in this position, accumulator 14 is not in fluid communication with mold inlet 40.

In this embodiment, valve 28 can be designed to rotate either along a horizontal axis which is perpendicular to the plane of the paper or along a vertical axis which is parallel to the plane of the paper. For example, if rotatable along a horizontal axis, valve 28 can be rotated 90° counterclockwise such that opening 32 corresponds to manifold flow channel 36 and opening 34 corresponds to manifold flow channel 38. For reference purposes, this is referred to herein as the valve's second position. When in this second position, accumulator 14 is in fluid communication with mold 20 via manifold flow channels 36 and 38, and valve flow channel 30.

As indicated above, another manner in which valve 28 can rotate is along a vertical axis. If designed in such a manner, valve 28 can be rotated 180° such that opening 32 corresponds to manifold flow channel 38, while opening 34 remains in fluid communication with manifold flow channel 36. For reference purposes, this is also referred to as the valve's second position. Regardless of whether valve 28 rotates 90° along a horizontal axis or 180° along a vertical axis, when it is in its second position feeder 10 is not in fluid communication with accumulator 14.

In the specific embodiment illustrated in FIG. 1, a heated nozzle sleeve 42 is, optionally, interposed between manifold 12 and mold 20. Mold sleeve 42 is a means for controlling the temperature of molten, moldable material flowing from accumulator 42 into mold 20 when valve 28 is in its second position.

It is within the scope of this invention to exclude nozzle sleeve 42. It is also within the scope of this invention to have sleeve 42 formed as an integral pan of manifold 12.

The apparatus illustrated in FIG. 1 also includes temperature controlling means 43 and temperature monitoring means 45. Controlling means 43 and monitoring means 45 are connected to feeder 10, accumulator 14, mold nozzle 42 and mold 20.

When operating the apparatus illustrated in FIG. 1, feeder 10 and mold cavity 54 are initially empty. Moreover, accumulator plunger 52 is positioned such that it completely fills cylinder 50; and valve 28 is in its first position.

In this preferred embodiment, the reason that plunger 52 is on its fully extended position is to minimize the presence of air bubbles in the molten material fed into cylinder 50. Here, plunger 52 can be connected to a relay of sorts which can impose pressure to hold its position at a certain level. On the other hand, plunger 52 can be loose such that it can "float". This configuration also affords a greater control on the "shot-size" of the material being fed into cavity 50.

A moldable material is fed into feeder 10 via feeder hopper 44. This material is liquified by the action of feeder screw 46. The temperature of feeder body 48 can, optionally, be controlled by temperature controller 43 to assist in the liquification of the moldable material contained therein.

After the material contained within feeder 10 is at the proper viscosity and temperature, feeder screw 46 is rotated in such a manner to force the now molten, moldable material through feeder outlet 22 into accumulator 14 via manifold flow channels 26 and 36, and valve flow channel 30.

The molten material entering into accumulator 14 displaces plunger 52 and fills cylinder 50 to a predetermined level. After accumulator cylinder 50 is filled, valve 28 is rotated to its second position such that accumulator 14 is in fluid communication with mold 20 and is not in fluid communication with feeder 10. As indicated above, this can be done by either a horizontal or vertical rotation.

When valve 28 is in its second position, plunger 52 is reciprocated in such a manner that it exerts a compressive force, shear stress and/or stress tensor on the molten, moldable material contained within cylinder 50. Simultaneously with this reciprocation, plunger 52 forces the molten, moldable material into mold cavity 54 via manifold flow channels 36 and 38, and valve flow channel 30. Accordingly, plunger 52 can exert a compressive force, shear stress and/or stress tensor on the molten, moldable material contained within the accumulator cylinder 50, the flow channels between cylinder 50 and mold 20, and/or mold cavity 54.

While plunger 50 is exerting a varying pressure on the material contained within cylinder 50, mold nozzle 42 and/or mold cavity 54, the temperature of this material is being monitored and controlled in accordance with a specific, predetermined temperature pattern.

One reason that it is desirable to apply a varying pressure on the molten, moldable material simultaneously with a varying temperature, prior to it entering mold cavity 54 is to induce a thermal history on the material.

After the molten, moldable material introduced into mold cavity 54 has been subjected to the predetermined reciprocation and temperature patterns, the material is solidified. During this solidification process, rotary valve 28 can remain in its second position so that plunger 52 can exert a packing force on the material. On the other hand, valve 28 can be rotated back to its first position so that feeder 10 can refill accumulator cylinder 50 with a new charge of a molten, moldable material.

After the material has solidified within mold 20, the mold is opened and the solidified material removed therefrom. The mold is then prepared for the next charge of molten, moldable material and returned back to its original position.

It is also within the purview of this invention to have valve 28 rotate to a position which is between its first position and its second position. This valve position is referred to herein as the valve's "intermediate position". When valve 28 is in such an intermediate position, opening 32 is not in fluid communication with either manifold flow channels 26, 36 or 38, Rather, opening 32 abuts against a solid wall within manifold 12.

Depending on the manner in which valve 28 rotates (i.e., along a horizontal axis perpendicular to the paper or along a vertical axis parallel to the plane of the paper) and/or the configuration of the valve's flow channels, the valve's intermediate position will vary. For example, if valve 28 rotates along a horizontal axis, when in its intermediate position, valve openings 32 and 34 should be positioned such that they both abut against a solid wall within manifold 12. As can be seen, when in this intermediate position, manifold channel 36 is no longer in fluid communication with valve flow channel 30.

When being rotated to such an intermediate position, plunger 52 can exert a compressive force, shear stress and/or stress tensor on the material contained within chamber 50 without forcing any molten, moldable material either into feeder 10 or into mold 20. However, in this configuration, plunger 52 will not exert such a varying stress on the moldable material contained within channel 30 since flow channel 36 is also not in fluid communication with accumulator 14 when valve 28 is in this particular intermediate position.

On the other hand, if valve 28 rotates along a vertical axis, when in its intermediate position, only valve opening 32 abuts against a solid wall within manifold 12. Valve opening 34 remains in fluid communication with manifold flow channel 36 and accumulator 14. Accordingly, when valve 28 is in this particular intermediate position, plunger 52 can exert a compressive force, shear stress and/or stress tensor on not only the material contained within chamber 50, but also the material contained within channel 30.

Figure 2:
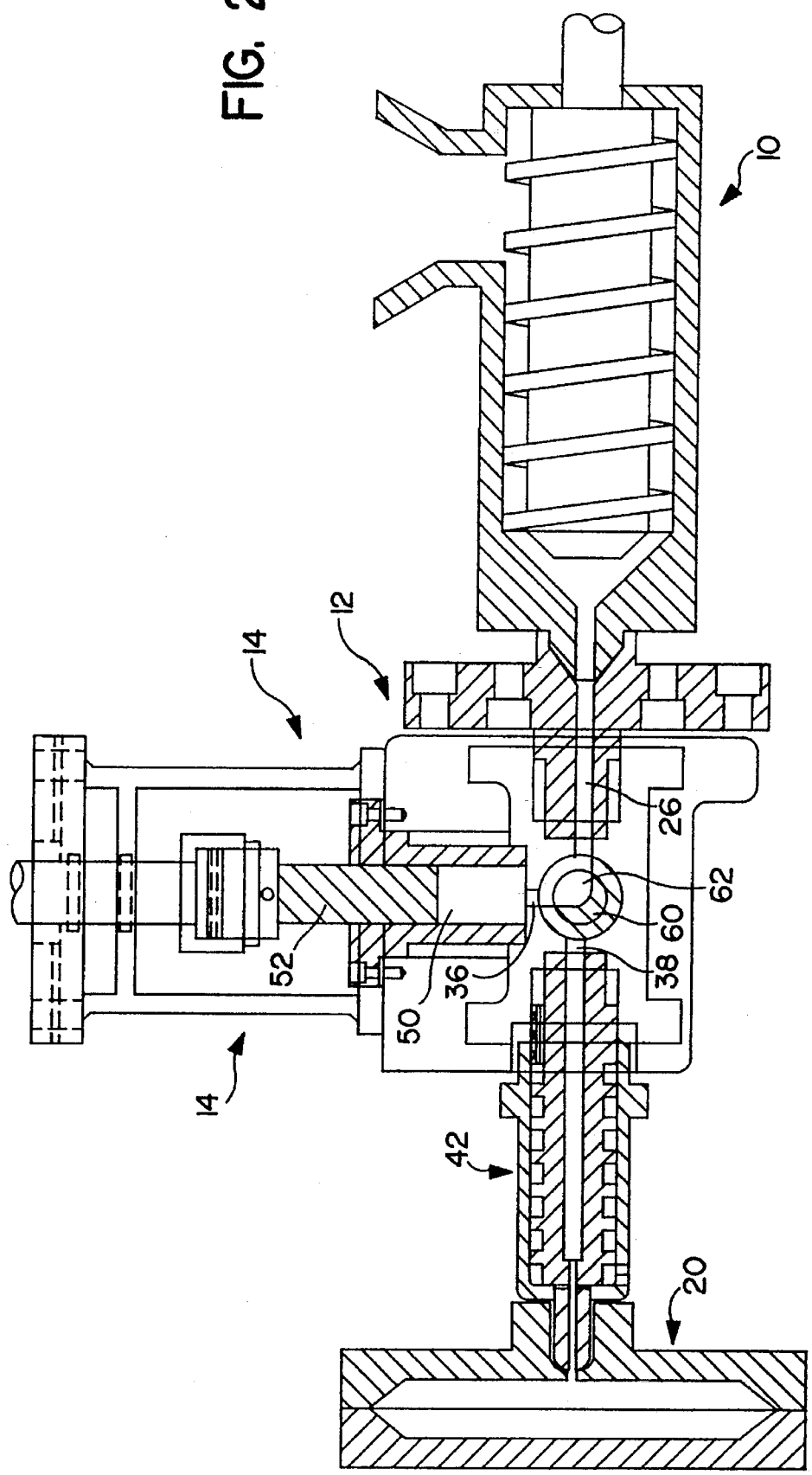
FIG. 2 is a schematic illustration of one embodiment of a molding apparatus designed in accordance with the present invention having a single feeder and a single accumulator, wherein the flow control means comprises another specific design of a rotatable valving mechanism.

FIG. 2 illustrates an apparatus which is similar to that illustrated in FIG. 1 in that both apparatuses include a feeder 10, a manifold 12, an accumulator 14, a mold nozzle 42 and a mold 20. Temperature control means 43 and temperature monitor means 45 are not shown in FIG. 2 to simplify the drawings. Accordingly, the major difference between these two apparatuses is the rotary valve being employed.

Specifically, in FIG. 2, rotary valve 60 has flow channel 62 passing therethrough. With this design, plunger 52 can exert a compressive force, shear stress and/or stress tensor on the material contained within the valve's flow channel, when the valve is in an intermediate position, regardless of whether the valve rotates along a horizontal axis which is perpendicular to the paper or along a vertical axis which is parallel to the plane paper.

Figure 3:
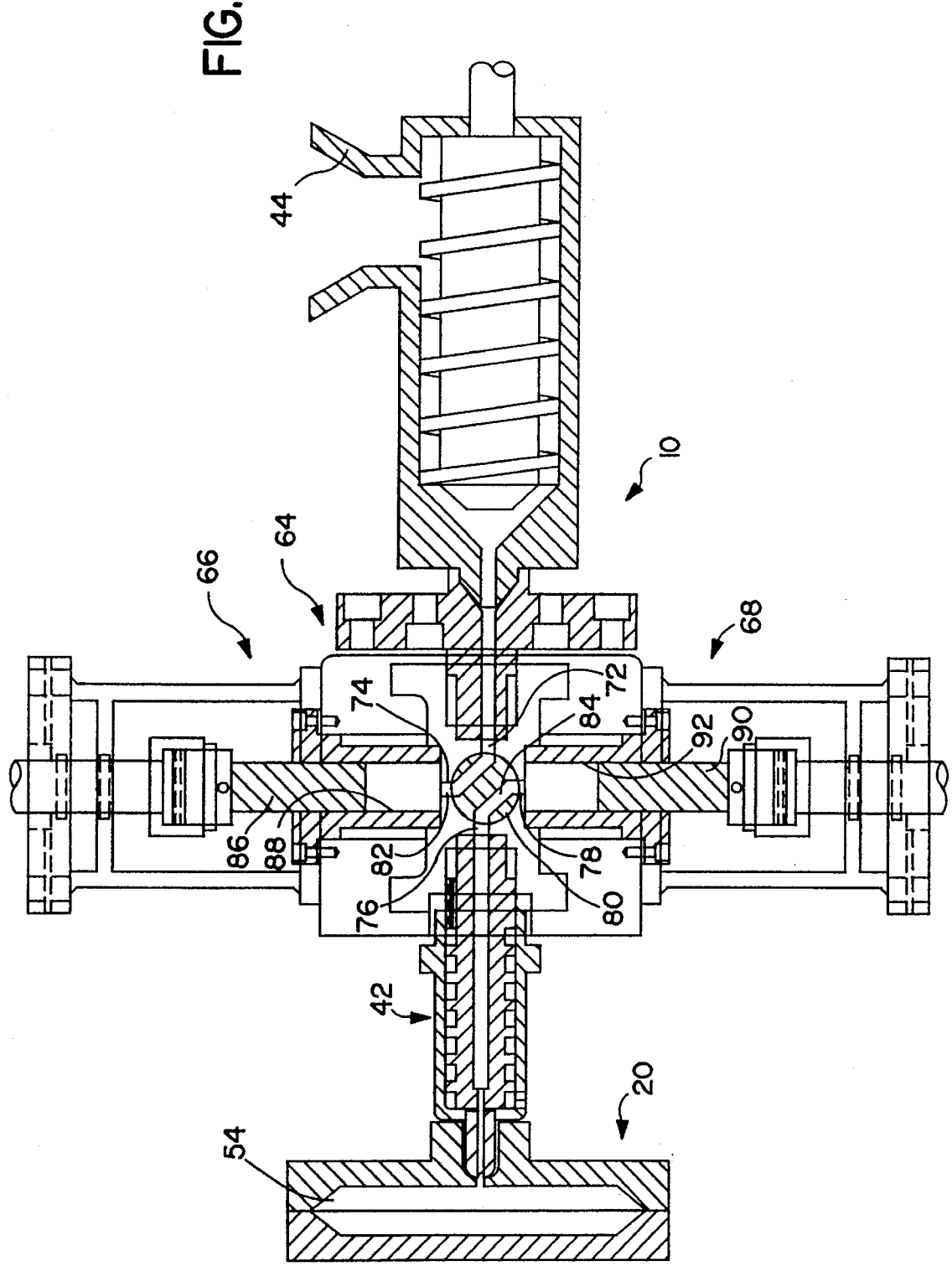
FIG. 3 is a schematic illustration of one embodiment of a molding apparatus designed in accordance with the present invention having a single feeder and more than one accumulator, wherein the flow control means comprises one specific design of a rotatable valving mechanism.
Figure 4:
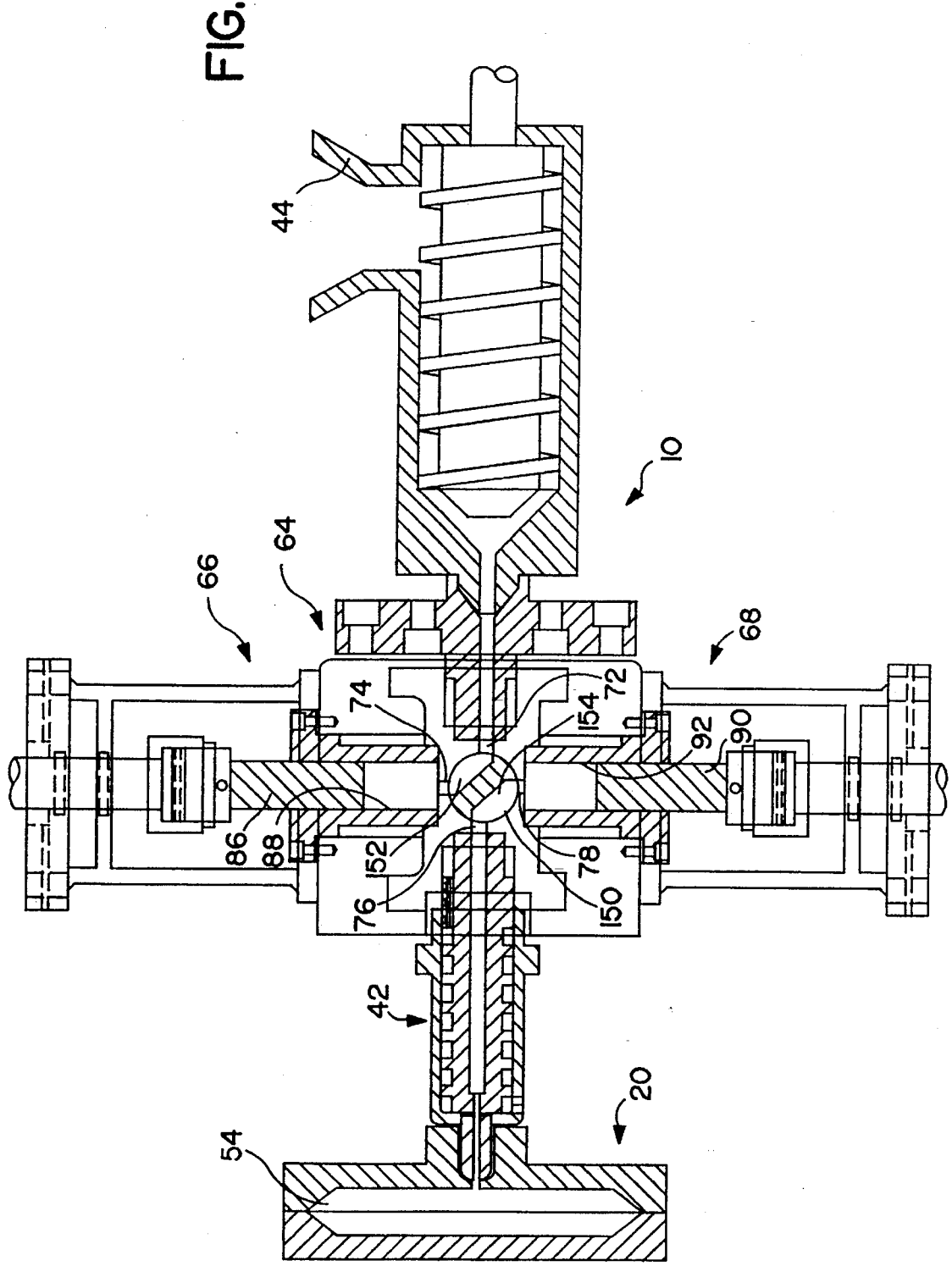
FIG. 4 is a schematic illustration of one embodiment of a molding apparatus designed in accordance with the present invention having a single feeder and more than one accumulator, wherein the flow control means comprises another specific design of a rotatable valving mechanism.
Figure 5:
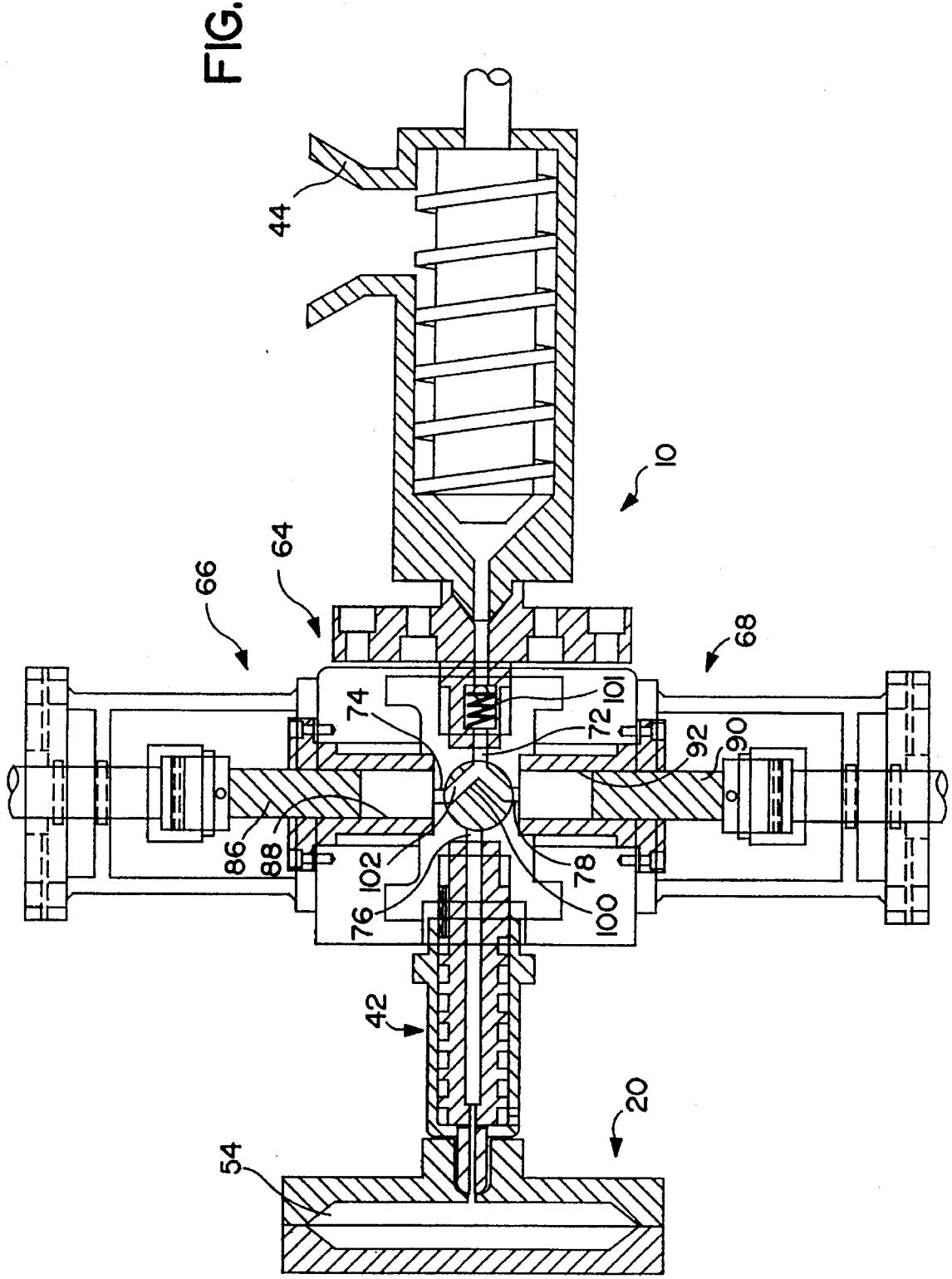
FIG. 5 is a schematic illustration of one embodiment of a molding apparatus designed in accordance with the present invention having a single feeder and more than one accumulator, wherein the flow control means comprises a specific design of a rotatable valving mechanism which allows a single feeder to simultaneously feed the same material into a plurality of accumulators, and a specific design of a check valve mechanism which prevents the flow of material back into the feeder from the accumulators.

FIGS. 3–5 illustrate various embodiments of the present invention which employ two separate accumulators. These figures illustrate apparatuses which are similar to one another in that they all include a feeder 10, a manifold 64, a nozzle sleeve 42, a mold 20 and accumulators 66 and 68. Moreover, these apparatuses also have in common the positioning of manifold flow channels 72, 74, 76 and 78.

Those apparatuses also have in common with one another a temperature control means and a temperature monitor means, both of which are interconnected with the feeder 10, the accumulators 66 and 68, mold nozzle 42 and mold 20. However, to simplify the drawings, the temperature control means and the temperature monitor means are not shown.

Accordingly, the major difference between the apparatuses illustrated in FIGS. 3–5 is the rotary valve being employed. Specifically, in FIG. 3, rotary valve 80 is employed which has flow channels 82 and 84 passing therethrough; in FIG. 4, rotary valve 150 is employed which has flow channels 152 and 154 passing therethrough; and in FIG. 5, rotary valve 100 is employed which has flow channel 102 passing therethrough.

Figure 9:
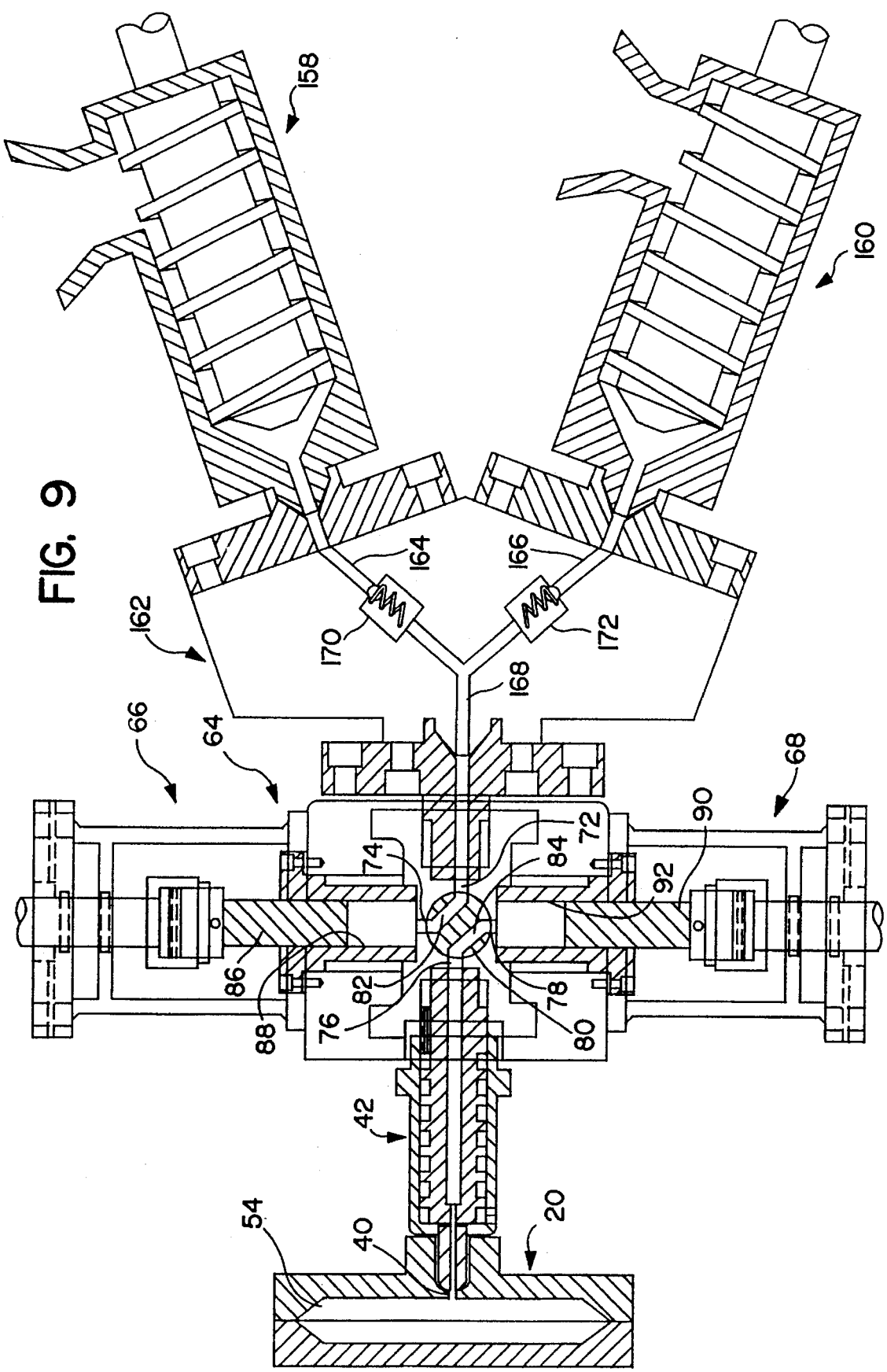
FIG. 9 is a schematic illustration of one embodiment of a molding apparatus designed in accordance with the present invention having more than one accumulator and more than one feeder, wherein the flow control means comprises one specific design of a rotatable valving mechanism and one specific design of a check valve mechanism which prevents the flow of material back into the feeders from the accumulators.
Figure 13:
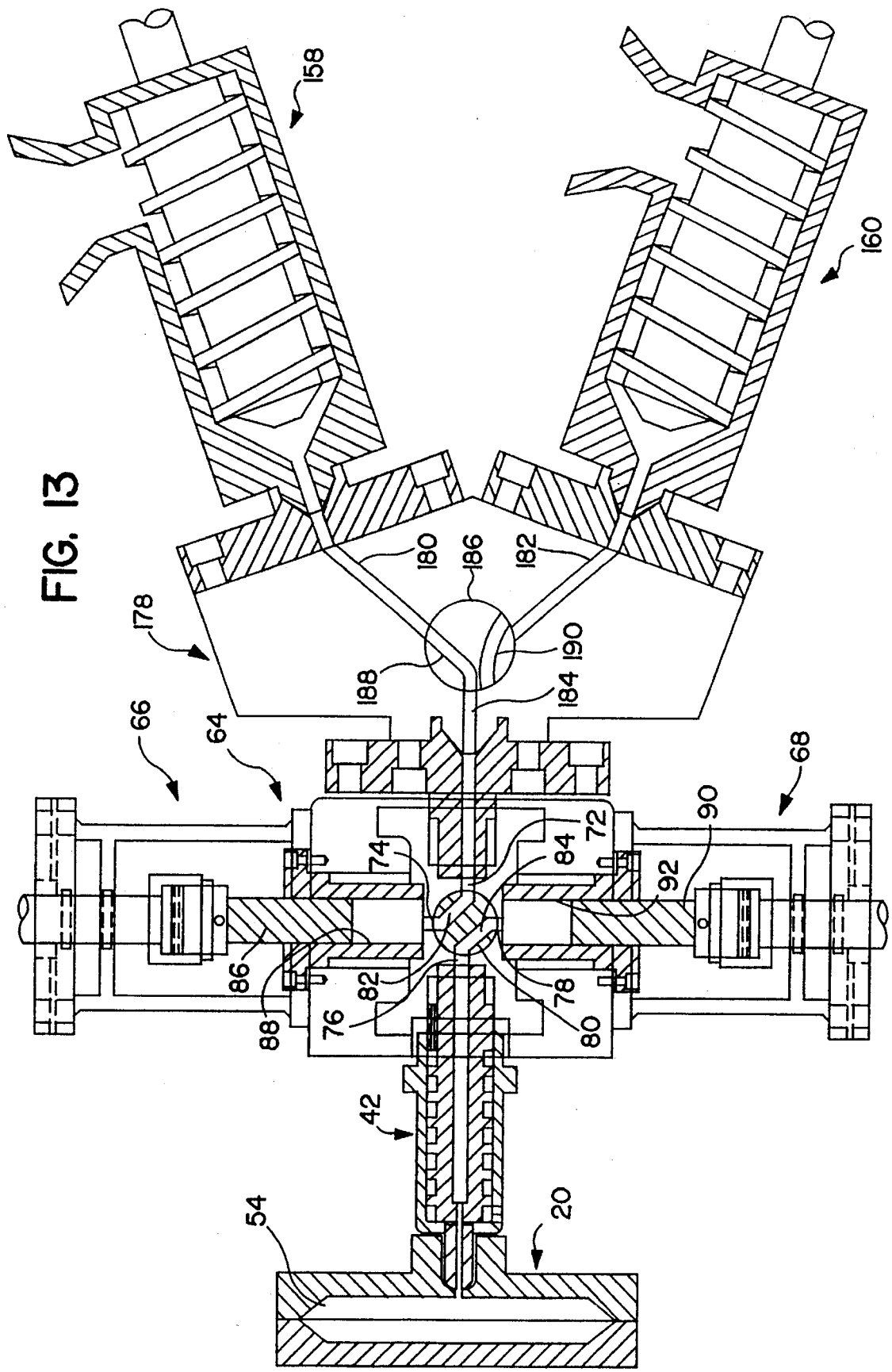
FIG. 13 is a schematic illustration of one embodiment of a molding apparatus designed in accordance with the present invention having more than one accumulator and more than one feeder, wherein the flow control means comprises a specific rotatable valving mechanism interposed between the plurality of accumulators and the mold, and another specific rotatable valving mechanism interposed between the plurality of feeders.

It should be noted that the multiple accumulator assembly design illustrated in FIGS. 3 and 4 is especially useful when multiple feeders are employed. Under these circumstances, the plurality of feeders can feed, into their respective accumulators, either the same material, the same material at different consistencies and/or temperatures, or materials which have a different composition or are of a different grade. Examples of such embodiments are illustrated in FIGS. 9 and 13 which will be discussed later in more detail.

Referring now to FIG. 3, when rotary valve 80 is in its first position (i.e., the position illustrated in FIG. 3), feeder 10 is in fluid communication with accumulator 66 via valve flow channel 82. Similarly, accumulator 68 is in fluid communication with mold 20 via valve flow channel 84. However, when valve 80 rotates to its second position, feeder 10 will be in fluid communication with accumulator 68 while accumulator 66 will be in fluid communication with mold 20.

When operating the apparatus illustrated in FIG. 3, feeder 10 and mold cavity 54 are initially empty. Moreover, accumulator plungers 86 and 90 are in a fully extended position such that they completely fill cylinders 88 and 92, respectively; and valve 80 is in its first position.

A moldable material is fed into feeder 10 via hopper 44. This material is then liquified. After liquification, feeder 10 feeds the now molten, moldable material into accumulator cylinder 88 via manifold flow channels 72 and 74, and valve flow channel 82. As the material enters cylinder 88, plunger 86 is displaced. This filling process continues until the predetermined amount of moldable material has entered cylinder 88.

After the appropriate amount of the molten, moldable material has been fed into accumulator 66, valve 80 rotates to its second position such that accumulator 66 is now in fluid communication with mold 20. This, in turn, also makes accumulator 68 in fluid communication with feeder 10.

Plunger 86 is then manipulated to exert a compressive force, shear stress and/or stress tensor on the material contained within cylinder 88, mold nozzle 42 and/or mold cavity 54, while the temperature control means is simultaneously manipulating the temperature of the material contained therein. Thereafter, or simultaneously therewith, plunger 86 is employed to force the material contained within cylinder 88 into mold 20 via manifold flow channels 74 and 76, and valve flow channel 82. While this is occurring, feeder 10 can be feeding a second charge of a molten, moldable material into accumulator cylinder 92 via manifold flow channels 72 and 78, and valve flow channel 84.

After the first charge of the moldable material contained within mold 20 solidifies, the mold is opened and the product removed therefrom. Then, the mold is prepared for the next charge of a molten, moldable material. Once the empty mold is in place, valve 80 rotates such that accumulator 68 is in fluid communication with mold 20 via manifold flow channels 76 and 78 and valve flow channel 84; and accumulator 66 is, again, in fluid communication with feeder 10.

While valve 80 is in this position, plunger 90 is manipulated to exert a compressive force, shear stress and/or stress tensor on the material contained within cylinder 92, mold nozzle 42 and/or mold cavity 54, while the temperature controller means is manipulating the temperature of the material contained therein. Thereafter, or simultaneously therewith, plunger 90 is employed to force the material contained within cylinder 92 into mold 20 via manifold flow channels 78 and 76, and valve flow channel 84. While this is occurring, feeder 10 can be feeding a third change of a molten, moldable material into cylinder 88 via manifold flow channels 72 and 74, and valve flow channel 82. This process continues until the desired number of products are made.

As with the embodiment illustrated in FIGS. 1 and 2, the valves illustrated in FIGS. 3–5 can be rotated to a position which is between their respective first positions and second positions. When in this intermediate position, accumulator cylinders 88 and 92 are not in fluid communication with either feeder 10 or mold 20.

When being rotated to such an intermediate position, plungers 86 and 90 can exert a compressive force, shear stress and/or stress tensor on the material contained within cylinders 88 and 92, while the temperature controller manipulates the temperature of the material contained therein. Whether plungers 86 and 90 are able to also exert such a stress on the material contained within the flow channels of the particular valve being employed depends upon the configuration of these flow channels and/or the manner in which the valve is rotated (i.e., along a horizontal axis which is perpendicular to the plane of the paper or along a vertical axis which is parallel to the plane of the paper).

FIG. 4 illustrates an apparatus which is similar to that illustrated in FIG. 3. As indicated above, the major difference between these two apparatuses is the rotary valve being employed. Specifically, in FIG. 4, rotary valve 150 has flow channels 152 and 154 passing therethrough. With this design, plungers 86 and 90 can exert a compressive force, shear stress and/or stress tensor on the material contained within the valve's flow channels, when the valve is in an intermediate position, regardless of whether the valve rotates along a horizontal axis or a vertical axis.

FIG. 5 also illustrates an apparatus which is similar to that illustrated in FIGS. 3 and 4. Again, the major differences between these apparatuses is the rotary valve being employed.

Specifically, in FIG. 5, rotary valve 100 has flow channel 102 passing therethrough. When in its first position (i.e., the position illustrated in FIG. 5), valve flow channel 102 interconnects accumulators 66 and 68 with feeder 10. Accordingly, feeder 10 can simultaneously fill cylinders 88 and 92 with a molten, moldable material.

In the specific apparatus illustrated in FIG. 5, valve 100 moves to its second position by rotating 180° along a vertical axis which is parallel to the plane of the paper. Accordingly, when valve 100 is in its second position, accumulators 66 and 68 are in fluid communication with mold 20. This allows plungers 88 and 90 to reciprocate in such a manner as to exert a compressive force, shear stress and/or stress tensor on the same material contained within cylinders 88 and 92, manifold flow channels 72 and 74, and valve flow channel 102 while the temperature controller manipulates the temperature of the material contained therein. Thereafter, or simultaneously therewith, plungers 86 and 90 can be employed to force the material contained within cylinders 88 and 92 into mold 20.

It is also within the purview of this invention to have valve 100 rotate 180° along a horizontal axis which is perpendicular to the plane of the paper. Under these circumstances, when valve 100 is in its second position, accumulators 66 and 68 are in fluid communication with mold 20. This allows plungers 88 and 90 to reciprocate in such a manner as to exert a compressive force, shear stress and/or stress tensor on the moldable material in the same manner indicated above.

It should be noted, however, that if valve 100 rotates 90° counterclockwise along a horizontal axis, it will be in a position whereby accumulator 66 is in fluid communication with mold 20 and feeder 10. This configuration can be used to have plunger 88 be the sole source of the compressive force, shear stress and/or stress tensor being exerted onto the moldable material. Under these circumstances, a second flow control means should be present which prevents the flow of molten, moldable material back into the feeder from the accumulator. In FIG. 5, such a flow control means is one-way check valve mechanism 101 positioned at the feeder outlet.

Similarly, if valve 100 rotates 90° clockwise along a horizontal axis, accumulator 68 will be in fluid communication with mold 20 and feeder 10. Under these circumstances, plunger 90 can be the sole source of the compressive force, shear stress and/or stress tensor exerted onto the molten, moldable material. Again, if this design is employed, one-way check valve mechanism 101 prevents the flow of molten, moldable material back into feeder 10.

FIGS. 6–16 illustrate further embodiments of practicing the present invention. In these Figures, various flow control means are employed. For example, in FIGS. 6 and 7, manifolds 150 and 152, respectively, do not have a rotatable valve positioned therein. Rather, the means which prevents the flow of molten, moldable material from the accumulator(s) back into the feeder(s), when the accumulator(s) pressure exertion means is exerting a shear stress, compressive force and/or stress tensor on the molten, moldable material contained within its cavity and/or within or passing through the mold cavity is a one-way check valve mechanism. Specifically, in FIG. 6, this check valve mechanism is identified as item number 154; and in FIG. 7, the check valve mechanism is identified as item number 156.

Figure 6:
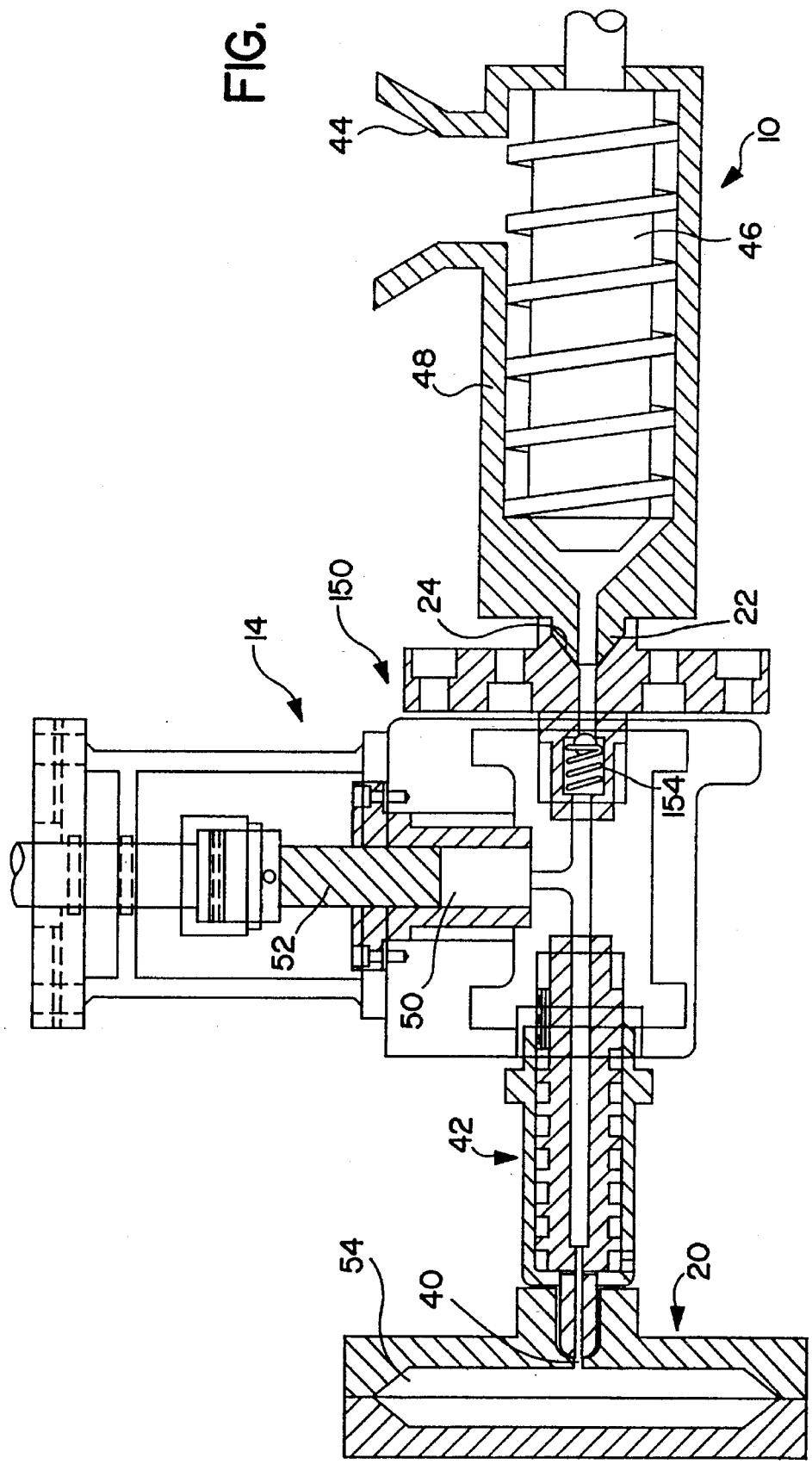
FIG. 6 is a schematic illustration of one embodiment of a molding apparatus designed in accordance with the present invention having a single feeder and a single accumulator, wherein the flow control means comprises one specific design of a check valve mechanism which prevents the flow of material back into the feeder from the accumulator.
Figure 7:
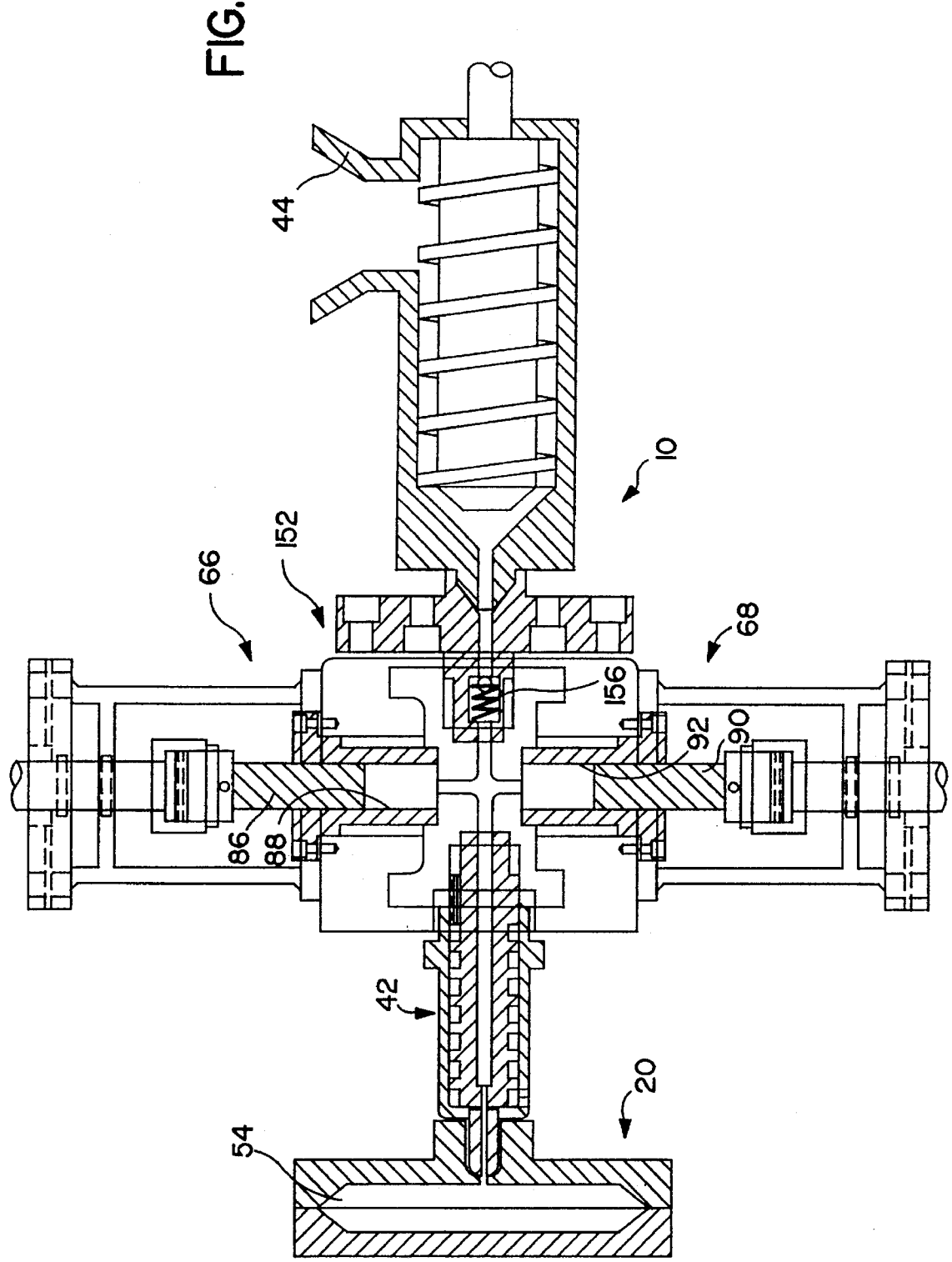
FIG. 7 is a schematic illustration of one embodiment of a molding apparatus designed in accordance with the present invention having a single feeder and more than one accumulator, wherein the flow control means comprises one specific design of a check vane mechanism which prevents the flow of material back into the feeder from the accumulators.

As with the earlier embodiments, those illustrated in FIGS. 6 and 7 include a temperature control means and a temperature monitor means, both of which are interconnected to the feeder, the accumulator(s), the mold nozzle and the mold. For purposes of simplification, the temperature controller and monitor are not illustrated in FIGS. 6 and 7.

When practicing the invention illustrated in FIGS. 6 and 7, the material expelled from feeder 10 fills not only the accumulator(s) cavity, but also the mold cavity. Then, after all of these cavities are filled to their predetermined level, the respective accumulator(s) plunger is reciprocated in accordance to a predetermined reciprocation pattern while the temperature controller controls the temperature of the material contained therein in accordance to a predetermined temperature pattern.

In FIGS. 8–13, the embodiments of the invention illustrated therein include a multiple feeder assembly system. Specifically, these Figures have in common feeders 158 and 160. These Figures also have in common a temperature control means and a temperature monitor means interconnected to the feeders, the accumulator(s), the mold nozzle and the mold. However, as with the earlier Figures, the temperature controller and monitor are not illustrated in FIGS. 8–13 to simplify the drawings.

In FIGS. 8–11, feeders 158 and 160 are in fluid communication with feeder manifold 162. Manifold 162 has associated therewith flow channel 164 which is in fluid communication with feeder 158; and flow channel 166 which is in fluid communication with feeder 160. Flow channels 164 and 166 meet to form flow channel 168 which exits manifold 162.

Interposed between flow channels 164 and 168 is check vane mechanism 170. Similarly, interposed between flow channels 166 and 168 is check valve mechanism 172. Check valves 170 and 172 are positioned such that they prevent the flow of molten, moldable material from flow channel 168 into either flow channels 164 or 166.

Figure 8:
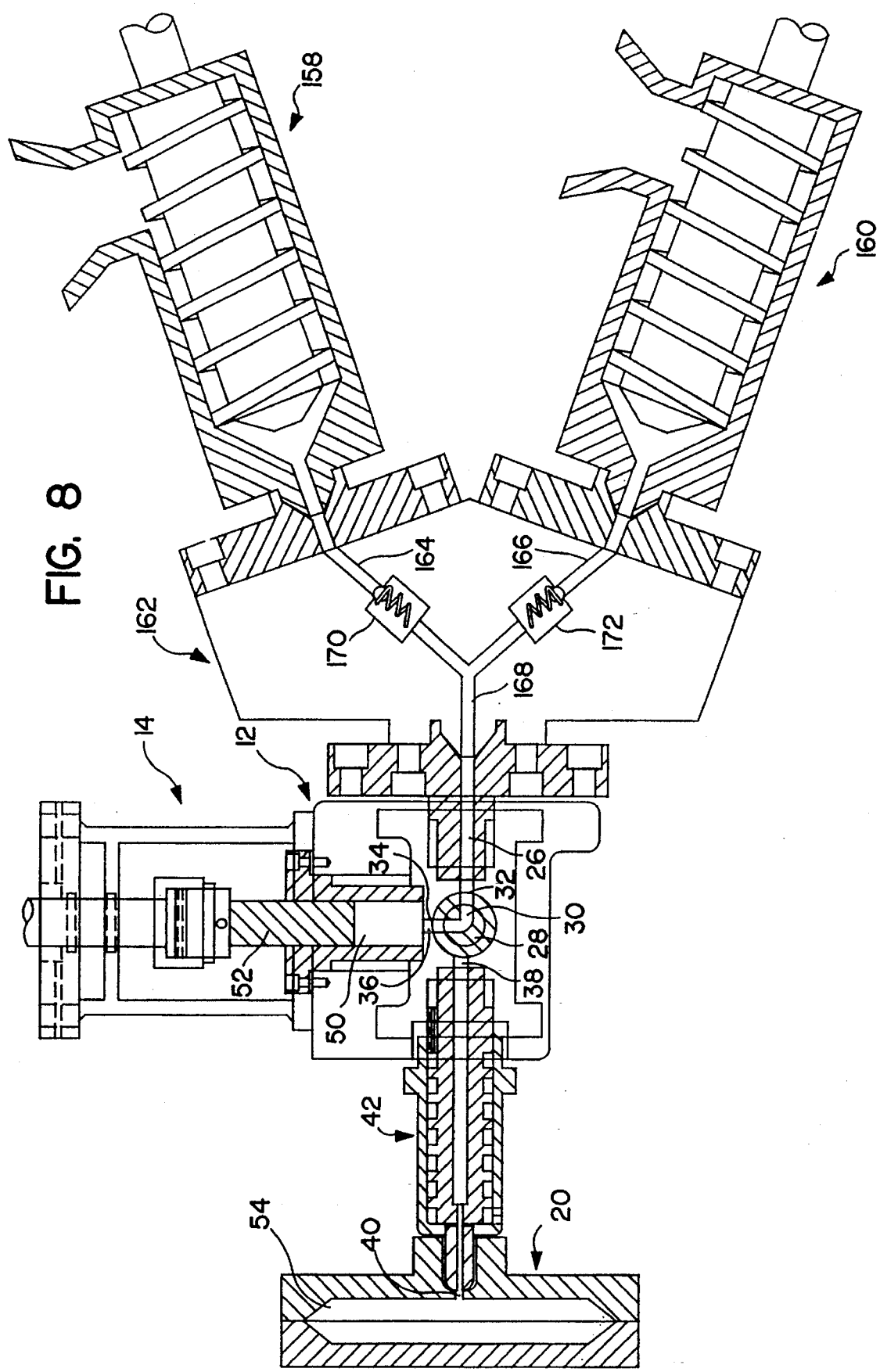
FIG. 8 is a schematic illustration of one embodiment of a molding apparatus designed in accordance with the present invention having a single accumulator and more than one feeder, wherein the flow control means comprises one specific design of a check valve mechanism which prevents the flow of material back into the feeder from the accumulator, and one specific design of a rotatable valving mechanism.

In FIG. 8, the manifold, accumulator and mold assembly is identical to that illustrated in FIG. 1. Accordingly, except for the specific feeder assembly employed, these two apparatuses operate in a similar manner.

On the other hand, in FIG. 9, the manifold, accumulators and mold assembly is identical to that illustrated in FIG. 3. Accordingly, except for the specific feeder assembly employed, these two apparatuses operate in a similar manner.

Figure 10:
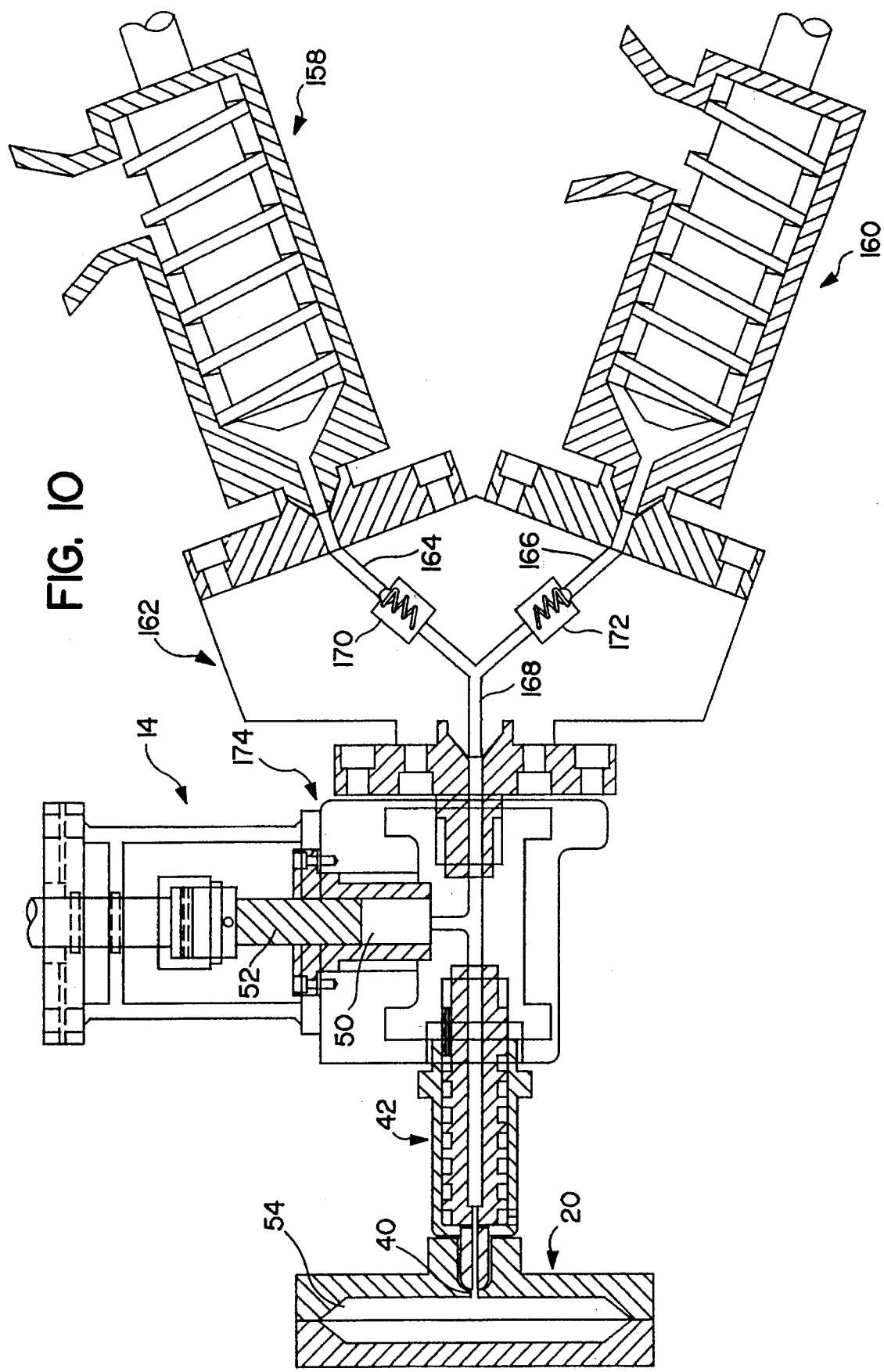
FIG. 10 is a schematic illustration of one embodiment of a molding apparatus designed in accordance with the present invention having a single accumulator and more than one feeder, wherein the flow control means comprises one specific design of a check valve mechanism which prevents the flow of material into the feeders from the accumulator.

The apparatus illustrated in FIG. 10 includes accumulator 14, mold nozzle 42 and mold 20, as does the apparatus illustrated in FIG. 1. However, in the apparatus illustrated in FIG. 10, a multiple feeder assembly is employed and manifold 12 replaced by manifold 174.

Specifically, in FIG. 10, feeder manifold 162 feeds a molten, moldable material through manifold flow channel 168 into manifold 174. Manifold 174 does not have a rotary valve positioned therein, Rather, it has flow channels therethrough which lead to accumulator 14 and mold 20.

Figure 11:
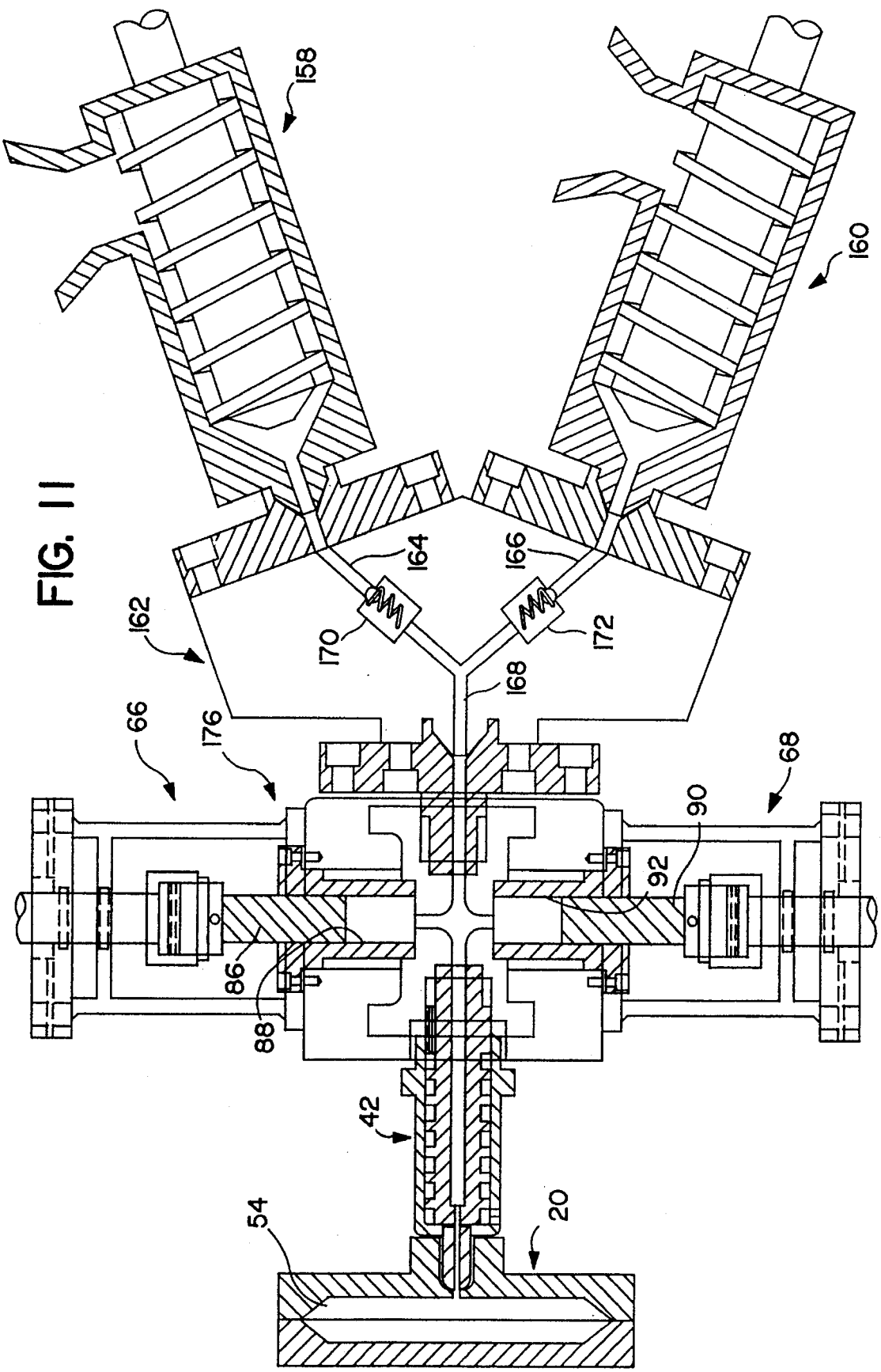
FIG. 11 is a schematic illustration of one embodiment of a molding apparatus designed in accordance with the present invention having more than one accumulator and more than one feeder, wherein the flow control means comprises a check valve mechanism which prevents the flow of material from the accumulators back into the feeders.

Similarly, in FIG. 11, feeder manifold 162 feeds a molten, moldable material via manifold flow channel 168 into manifold 176. Manifold 6 also does not have a rotary valve positioned therein. Rather, it has flow channels therethrough which lead to accumulators 66 and 68 and mold 20.

When employing the apparatus illustrated in FIG. 10, molten, moldable material is introduced into manifold 174 via manifold flow channel 168. This material continues to flow until it fills accumulator cylinder 50 and mold cavity 54 to their predetermined levels. Thereafter, and/or simultaneously therewith, accumulator plunger 52 is reciprocated in accordance with a specific reciprocation pattern as the temperature in cylinder 50, mold nozzle 42 and/or mold 50 is manipulated by the temperature controller in accordance to a predetermined temperature pattern. The molten material is then permitted to solidify within mold cavity 54. Preferably, this occurs while plunger 52 exerts a packing force thereon.

Similarly, when employing the apparatus illustrated in FIG. 11, molten, moldable material is fed into manifold 176 via manifold flow channel 168. This material continues to flow until' accumulator cylinders 88 and 92, and mold cavity 54 are filled to the predetermined levels. Thereafter, and/or simultaneously therewith, accumulator plungers 86 and 90 are reciprocated in accordance with a specific reciprocation pattern as the temperature in cylinders 88 and 92, mold nozzle 42 and/or mold 50 is manipulated by the temperature controller in accordance to a predetermined temperature pattern. The molten material is then permitted to solidify within mold cavity 54. Preferably, this occurs while plungers 86 and/or 90 exert a packing force thereon.

Figure 12:
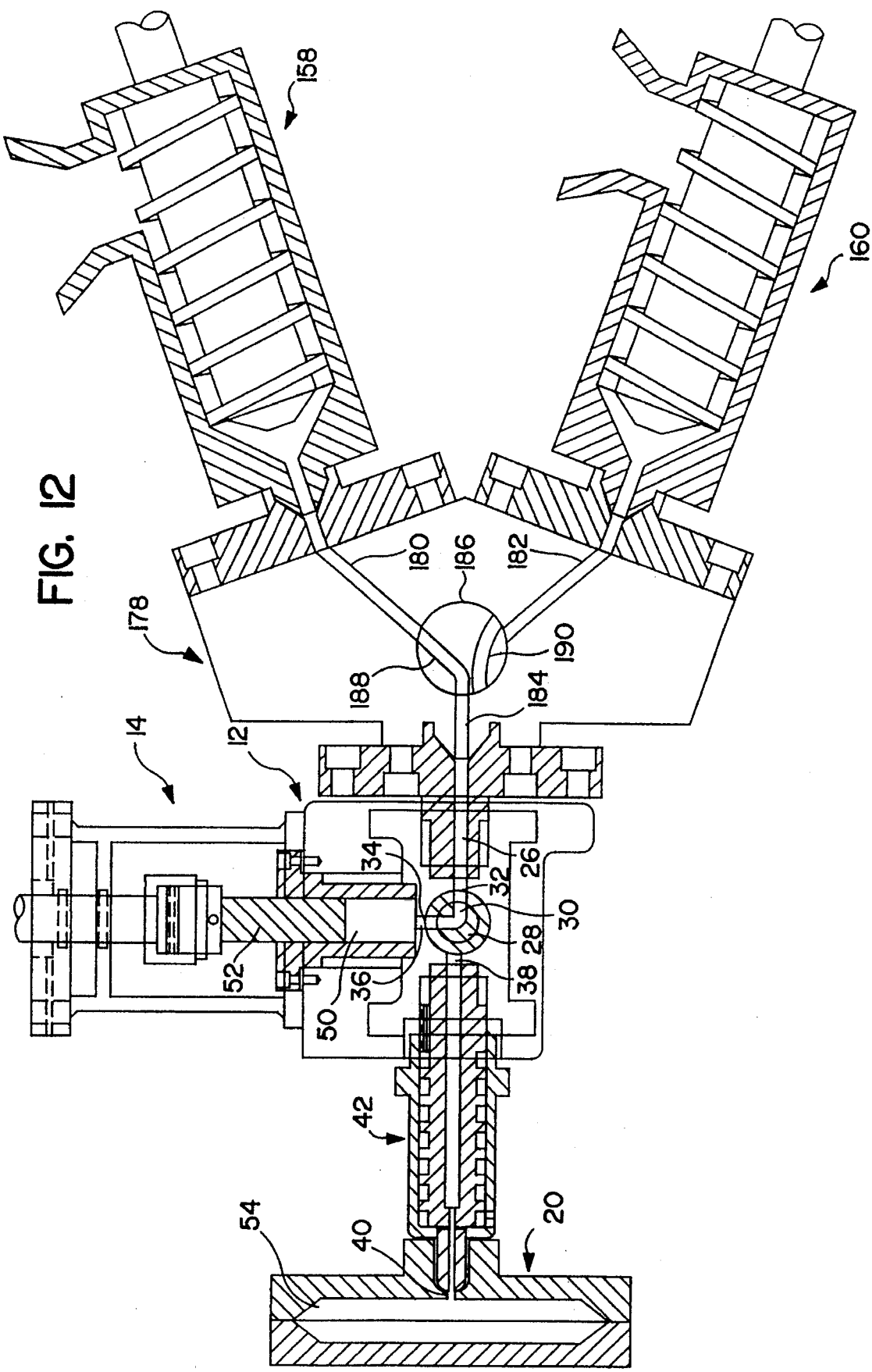
FIG. 12 is a schematic illustration of one embodiment of a molding apparatus designed in accordance with the present invention having a single accumulator and more than one feeder, wherein the flow control means comprises a specific rotatable valving mechanism interposed between the accumulator and the mold, and another specific rotatable valving mechanism interposed between the plurality of feeders.

In FIGS. 12 and 13, feeders 158 and 160 are in fluid communication with feeder manifold 178. Manifold 178 has associated therewith flow channel 180 which is in fluid communication with feeder 158; and flow channel 182 which is in fluid communication with feeder 160. Flow channels 180 and 182 meet to form flow channel 184 which exits manifold 178.

These Figures also have in common a temperature control means and a temperature manifold means interconnected to the feeders, the accumulator(s), the mold nozzle, and the mold. However, as with the earlier Figures, the temperature controller and monitor are not illustrated in FIGS. 12 and 13 to simplify the drawings.

Interposed between flow channels 180, 182 and 184 is rotary valve 186. Valve 186 has flow channels 188 and 190 passing therethrough.

In the specific embodiments illustrated in FIGS. 12 and 13, valve 186 is designed to rotate along a horizontal axis which is perpendicular to the plane of the paper. When valve 186 is in its first position (i.e., the position shown in FIGS. 12 and 13), valve flow channel 188 interconnects manifold flow channels 180 and 184. This allows feeder 158 to feed a molten, moldable material into manifold 12. If it is desirable to feed a molten, moldable material from feeder 160 into manifold 12, valve 186 is rotated in a clockwise manner until valve flow channel 190 interconnects manifold flow channels 182 and 184.

As can be seen, the accumulator and mold assemblies illustrated in FIG. 12 is identical to that illustrated in FIG. 1. Accordingly, except for the specific feeder assembly employed, these two apparatuses operate in a similar manner.

Similarly, the accumulator and mold assemblies illustrated in FIG. 13 is identical to that illustrated in FIG. 3. Accordingly, except for the specific feeder assembly employed, these two apparatuses operate in a similar manner.

With regard to FIGS. 8–13, the plurality of feeders can feed, into their respective accumulators, either the same material, the same material having different consistencies relating to their chemical composition, completely different materials, and/or materials of a different grade (e.g., one from recycling and the other from non-recycling wherein the recycle grade of material is injected into the mold after the virgin material). For example, when employing the apparatuses illustrated in FIGS. 8–13, a material with fibers can be loaded into one feeder and a material without fibers can be loaded into another feeder. Such a configuration can be used to create a two-stage injection process wherein one accumulator would be fed through the feeder with a matrix of a plastic (e.g., PEEK) without fibers and the other accumulator could be fed through a feeder with a matrix of the same plastic but with fibers. This allows one to first inject a moldable material from the first accumulator to form an envelope which covers the outside shell of the mold. Thereafter, an aligned array of fibers can be injected into the mold via the second accumulator.

One of the results of exerting a compressive force, shear stress and/or stress tensor on the material contained within the accumulator(s) and/or within the mold is that, in apparatuses which charge two different materials into a mold, the penetration of the second charge of material is enhanced. This creates a homogeneous mixture of the two materials; thus keeping the envelope within the skin which has been created by the first injection stage.

In those instances where there is more than one reciprocating device (e.g., a plurality of accumulators) and where the valve flow channels are such that they interconnect at least two separate accumulators, the manipulation of the moldable material is performed by reciprocating the drivable member (e.g., plunger) of each reciprocating device, with respect to any other drivable member, in one of the following: (a) at the same frequency, at a different amplitude and out of phase, (b) at the same frequency, at a different amplitude and in phase, (c) at a different frequency and at the same amplitude, (d) at a different frequency and at a different amplitude (e) at the same frequency, at the same amplitude and in phase, and (f) at the same frequency, at the same amplitude and out of phase. Moreover, while the moldable material is being manipulated in one of the aforementioned manners, the frequency, amplitude and/or phase shift of the drivable members can remain constant, be variable and/or be intermittent throughout the molding process.

As used herein, the term "frequency" refers to the number of times a particular drivable member oscillates per second (Hz). Moreover, the term "amplitude" refers to the maximum longitudinal distance traveled by a particular drivable member during half of an oscillation cycle. Finally, the term "phase" refers to the relative motion of one drivable member with respect to another which is oscillating at the same frequency.

When practicing this invention, the drivable member(s) can be reciprocated at any suitable frequency. The preferred frequency will depend, at least in part, upon the size of the drivable member, the number of reciprocating means, the amplitude of the drivable member, the location of the drivable member, and the like, as well as the desired effects on the resulting product. Those skilled in the art, after reading this specification, will be able to determine the optimum frequency which best suits their specific needs.

Notwithstanding the above, the frequency ($f$) at which each drivable member is reciprocated typically ranges from between about 1 to about 120 Hz. Preferably, each drivable member is reciprocated at a frequency ranging from between about 1 to about 100 Hz, and more preferably, from between about 1 to about 30 Hz.

When practicing the present invention with more than one reciprocating device which are in fluid communication with each other, one reciprocating device's drivable member is reciprocated at a frequency of $(f_1)$ and the other reciprocating device's drivable member is reciprocated at a frequency of $(f_2)$. Frequencies $(f_1)$ and $(f_2)$ each can range from about 1 to about 120 Hz.

When frequencies $(f_1)$ and $(f_2)$ are the same, the drivable members can operate at a different amplitude. On the other hand, when frequencies $(f_1)$ and $(f_2)$ are different, the drivable members can operate at the same or at a different amplitude.

When practicing this invention, the drivable member(s) can be reciprocated at any suitable amplitude. The preferred amplitude will depend, at least in part, upon the size of the drivable members, the number of reciprocating means, the frequency of the drivable member, the location of the drivable members, and the like, as well as the desired effects on the resulting product. Those skilled in the art, after reading this specification, will be able to determine the optimum amplitude which best suits their specific needs.

Notwithstanding the above, the amplitude $(\alpha)$ at which the drivable member is reciprocated is such that it generates a compressive force mold ranging from between about 100 to about 20,000 psi. Preferably, the drivable member is reciprocated at an amplitude such that it generates a compressive force ranging from between about 100 to about 15,000 psi, and more preferably, from between about 100 to about 10,000 psi.

When practicing the present invention with more than one reciprocating device which are in fluid communication with each other, one reciprocating device's drivable member is reciprocated at an amplitude of $(\alpha_1)$ and the other reciprocating device's drivable member is reciprocated at an amplitude of $(\alpha_2)$. Amplitudes $(\alpha_1)$ and $(\alpha_2)$ are such that they generate a compressive force within the mold ranging from between about 100 to about 20,000 psi.

When amplitudes $(\alpha_1)$ and $(\alpha_2)$ are the same, the drivable members must operate at a different frequency. On the other hand, when amplitudes $(\alpha_1)$ and $(\alpha_2)$ are different, the drivable members can operate at the same or at a different frequency.

It should be noted that, when two drivable members operate at the same frequency, at the same amplitude and 3.14 radians out of phase with one another, the reciprocation pattern does not generate any significant compressive force within the mold. Moreover, it has been discovered that the morphological structure of the resulting solid product (e.g., percentage crystallinity, orientation, free volume content, texture, etc.), from which the physical properties depend (e.g., tensile strength, tensile modulus, etc.), can be modified by reciprocating the drivable members in a manner which not only creates a shear stress, on the moldable material, but also simultaneously generates a compressive force thereon. As indicated above, manipulating a moldable material in such a manner is referred to herein as exerting a stress tensor thereon.

One of the objects of this invention is to exert a specific stress tensor by separately monitoring and controlling the stress tensor's individual components (i.e., shear stress and compressive force). The shear stress component affects the orientation of the moldable material, where as the compressive force component affects the material's volume and, thus, its density. The proper mixture of these two components in time, results in an original history pattern which modifies the morphology and thus the physical properties of the resulting product.

In accordance with the present invention, when more than one accumulator is employed, which are also in fluid communication with one another, and when their drivable members are reciprocated at the same frequency, these drivable members can be reciprocated either "in phase" or "out of phase" with each other. The phase shift between two such drivable members can range from 0 to 6.28 radians.

When the phase shift is at the values of 0 or 6.28 radians, the drivable members are oscillating in phase with each other. On the other hand, when the phase shift is at an amount ranging from between a value slightly greater than about 0 radians to a value slightly less than 6.28 radians, the drivable members are oscillating out of phase with each other.

When more than one reciprocating device is employed, and when the drivable members of both devices are reciprocated at the same frequency, these drivable members can be oscillated at any suitable phase shift, or at none at all (i.e., "in phase"). The preferred phase shift will depend, at least in part, upon the size of the drivable members, the number of reciprocating means, the amplitude of the drivable members, the frequency of the drivable members, the location of the drivable members, and the like, as well as the desired effects on the resulting product. Those skilled in the art, after reading this specification, will be able to determine the optimum phase shift which best suits their specific needs.

Notwithstanding the above, when the various drivable members are reciprocated, the phase shift therebetween typically ranges from between about 0.79 to about 5.50 radians. Preferably, the drivable members are reciprocated at a phase shift ranging from between about 1.57 to about 4.71 radians, and more preferably, from between about 2.36 to about 3.93.

The maximum phase shift occurs at 3.14 radians. Accordingly, with all other variables being the same, the greatest amount of shear will result when the drivable members are reciprocating at a phase shift of 3.14 radians.

When practicing this invention, specific parameters (e.g., frequency, amplitude, etc.) that the drivable member(s) will reciprocate are selected. As indicated earlier, these settings for the drivable member(s) are collectively referred to herein as a specific "reciprocation pattern".

In accordance with the present invention, a reciprocation pattern can be designed to remain constant throughout the molding process. On the other hand, it is also within the purview of this invention to have this reciprocation pattern vary and/or be intermittent throughout the molding process.

For example, in one specific embodiment of practicing this invention, the accumulator(s) pressure exertion means can exert successive waves of vibrating impulses at certain frequencies and amplitudes followed by constant (i.e., flat) signals which create a non-vibrating regime. The level of this is programmed and corresponds to either a state of stress on the material or a state of relaxation. The time events defining the vibration signal that is the sequence of vibrating pulses and their origin and the flat regions and their magnitude, along with the frequency and amplitude of the pulses themselves, create a vibration pattern wave function which depends, in part, on temperature, the properties desired, and the structure modifications which are sought by the end user.

As can be appreciated by those skilled in the art, there are many different reciprocation patterns which can be used when practicing this invention. Each pattern will modify the properties of the resulting product in its own specific manner. As indicated above, the preferred reciprocation pattern will depend, in part, upon the desired end results.

After reading this specification, those skilled in the art will be able to determine the specific reciprocation pattern which best suits their needs through simple experimentation. For example, this can be done by noting the physical properties of a material which was molded in accordance with a particular reciprocation pattern and a particular temperature pattern.

Then, subsequent materials are prepared in accordance with the present invention wherein one of the stress exertion parameters (e.g., frequency, amplitude and/or phase shift and the variation of those parameters with time during the process) is changed while the temperature pattern and all other variables are maintained constant. By comparing the morphological structure and/or the physical properties of these subsequent materials with those of the first material, a skilled artisan can see how the variance of a specific stress exertion parameter affects the particular material's morphological structure. This information can then used to determine how the stress exertion parameters must be modified in order to produce a product having the desired morphological structure and/or physical properties. Once the parameters have been established, the results can be easily reproduced by using the same reciprocation pattern under similar circumstances.

For example, by using thermal analysis instruments such as a Differential Scanning Calorimeter (DSC) and/or a Thermal Stimulated Current/Relaxation Map Analysis (TSC/RMA) spectrometer, skilled artisans should note a significant difference in the specific heat traces during heating at rate of 10° C. per minute which is characteristic of morphological changes occurring during the molding process. Moreover, skilled artisans should also note a significant difference in the relative positions of the melting temperature, glass transition temperature and secondary transitions, as shown in the TSC/RMA peaks. Furthermore, through such a thermal analysis of the resulting molded products, skilled artisans should observe that there is a significant difference in the intensity of the peaks which demonstrate, for example, that the product prepared in accordance with the present invention has a free volume distribution which has been altered.

Moreover, there are also many different temperature patterns which can be employed when practicing this invention. Each pattern will modify the properties of the resulting product in its own specific manner. The preferred temperature pattern will depend, in part, upon the desired end results.

After reading the specification, those skilled in the an will be able to determine the specific temperature pattern which best suits their needs through simple experimentation. For example, this can be done by noting the physical properties of a material which was molded in accordance with a particular temperature pattern and a particular reciprocation pattern.

Then, subsequent materials are prepared in accordance with the present invention wherein the temperature pattern is varied during the process while the reciprocation pattern and all other variables are maintained constant. By comparing the morphological structure and/or the physical properties of these subsequent materials with those of the first material, a skilled artisan can see how the variance of the temperature pattern affects the particular material's morphological structure. This information can be used to determine how the temperature pattern must be modified in order to produce a product having the desired morphological structure and/or physical properties. Once the parameters have been established, the results can be easily reproduced by using the same temperature pattern under similar circumstances.

When at least two accumulators which are in fluid communication with each other are employed, and when the phase shift between the reciprocation devices associated with each varies during the molding process, each reciprocation device's drivable member can be programmed to reciprocate in the following manner:

$$B_1 = A_0 + A_1 \sin(f_1 t + b_1)$$

$$B_2 = A'_0 + A'_1 \sin(f'_1 t + b'_1)$$

wherein $B_1$ is the amplitude of one drivable member and $B_2$ is the amplitude of another drivable member, and wherein $A_0(t)$, $A'_0(t)$, $A_1(t)$, $A'_1(t)$, $f_1(t)$, $f'_1(t)$, $b_1(t)$ and $b'_1(t)$ are functions of time.

The variables which can be inserted into these equations are selected such that the resulting reciprocation pattern will induce chances in the thermal history of the final product throughout the interaction between the propagation of the pressure/shear waves induced by the drivable member through the visco-elastic medium represented by the moldable material during the molding process and the interaction with the kinetics of solidification across phase transitions (TgTm).

In one preferred embodiment, the frequency of a particular reciprocation device's drivable member is twice that of another. Moreover, the amplitude of the higher frequency drivable member is smaller but varies faster than that of the other.

When the amplitude varies during the molding process, the amplitude average may vary exponentially in a preferred embodiment with the inverse of absolute temperature in the following manner to account for viscosity changes in the plastic:

$$A_{10} \exp(B/T)$$

wherein B is a constant which depends upon the material molded in accordance with the present invention, and wherein T is the average temperature of the molded material throughout the molding process.

Any suitable means can be employed to reciprocate the reciprocation devices drivable members. Examples of suitable means include, without limitation, hydraulic devices, pneumatic devices, mechanical devices, electrical devices, electromagnetic devices and any combination thereof. The preferred method of reciprocating the drivable members will depend, in part, upon the resources available to the person practicing this invention and the type of drivable member selected.

The compressive force, shear stress and/or stress tensor exerted upon the moldable material by the reciprocating devices can occur for any suitable period of time. The preferred period of time will depend, in part, upon the size of the reciprocating devices' drivable members, the number of reciprocating devices, the amplitude of the drivable members, the frequency of the drivable members, the location of the drivable members, and the like, as well as the desired effects on the resulting product. Those skilled in the art, after reading this specification, will be able to determine the optimum time period over which to exert the compressive force, shear stress an&or stress tensor which suits their specific needs.

The manner in which the compressive force, shear stress an&or stress tensor is applied to the moldable material is established by a predetermined program. Specifically, prior to manipulating the moldable material in accordance with the present invention, a specific reciprocation pattern and a specific temperature pattern are determined. For the reciprocation pattern, this would include not only determining specific starting frequencies, amplitudes, phase shift parameters and time parameters, but also determining whether these initial settings will vary and/or be intermittent or flat during the molding process, determining at what temperatures certain modifications occur when varying parameters such as $A_0(t)$, $A'_0(t)$, $A_1(t)$, $A'_1(t)$, $f_1(t)$, $f'_1(t)$, $b_1(t)$ and $b'_1(t)$, and determining whether packing forces will be exerted onto the moldable material prior to, and/or intermittently throughout, the reciprocation pattern. These determinations are based, in part, upon the temperature of the moldable material as measured by a suitable temperature sensing device (e.g., an infrared temperature sensing device).

Moreover, for the temperature pattern, this would include not only determining the specific stating temperatures, but also determining whether these initial settings will vary an&or be intermittent or flat during the molding process. As indicated above, after reading this specification, all of these determinations can be made by those skilled in the art through the use of simple deductive experimentation and reasoning.

After the compressive force, shear stress and/or stress tensor has been applied in accordance with a predetermined program, but before the moldable material solidifies in the mold's cavity, a packing force is preferably exerted thereon. As this packing force is being applied, the moldable material is subjected to a predetermined temperature pattern until the product solidifies. Before the mold is opened, the packing force is removed.

The packing force exerted onto the moldable material after, and optionally prior to and/or during, the reciprocation pattern can be applied by any suitable means known to those skilled in the art. For example, the packing force can be applied by a packing device (e.g., an extrusion screw, a piston, etc.), by the accumulator(s) pressure exertion means, and the like, and/or by any combination thereof.

After the product is solidified and the packing force removed, the product is extracted from the mold's cavity. The manner in which the solid product is extracted depends, in part, upon the specific type of mold, molding process and/or molding apparatus.

FIG. 14 illustrates an optional device which can be used when practicing this invention. Specifically, in this embodiment, a slidable purge valve 190 is interposed between a mold nozzle 42 and a mold 20. Purge valve 190 has channels 192 and 194 passing therethrough.

When purge valve 190 is in its first position (i.e., the position illustrated in FIG. 14), mold nozzle 42 is in fluid communication with mold 20 via purge valve channel 192. This allows molten, moldable material to pass from nozzle 42 into mold 20. However, when purge valve 190 is moved to its second position, mold nozzle 42 is in fluid communication with valve channel 194. Accordingly, mold nozzle 42 is no longer in fluid communication with mold 20. Therefore, when valve 190 is in its second position, molten, moldable material passes from nozzle 42 into channel 194 and to waste or regrind.

One of the objects of including purge valve 190 upstream of a mold is to remove any stagnant and/or undesirable material from the flow channels between the feeder and the mold prior to introducing any new material into the mold. Such a configuration is highly desirable when a multiple feeder system is employed. It should be noted that a purge valve can also, optionally, be interposed between the apparatus' feeder assembly and its accumulator assembly.

FIG. 15 illustrates another optional device which can be used when practicing this invention. Specifically, in this embodiment, a holding chamber 195 is interposed between a feeder 10 and a manifold 12. Holding chamber 195 defines a cavity 196 and includes a plunger 197. Moreover, also associated with holding chamber 195 is temperature controller 198.

The holding chamber illustrated in FIG. 15 can thermally and mechanically condition a molten, moldable material either after the material exits the feeder(s) and enters the accumulator(s), and/or after the material exits the accumulator(s) and enters the mold.

This embodiment is particularly useful when employing a multiple feeder assembly which feeds a first material into the mold followed by a second material. For example, a holding chamber as illustrated in FIG. 15 can be used to inject a colder material at the second stage inside of the first stage to match densities.

Specifically, the first stage introduced into the mold forms a shell and begins to cool. Then, the second stage is introduced inside the first stage. This second stage is introduced at a lowered temperature so that the first stage and second stage harden at approximately the same time. This allows a much greater homogeneity of the molded pan across its thickness when compared to conventional core-shell morphological and structural differences induced by inhomogeneous cooling from the surface inwards. It also allows the creation of shear effects inside the pan which modify its clarity by changing the kinetics of crystallization.

Figure 16:
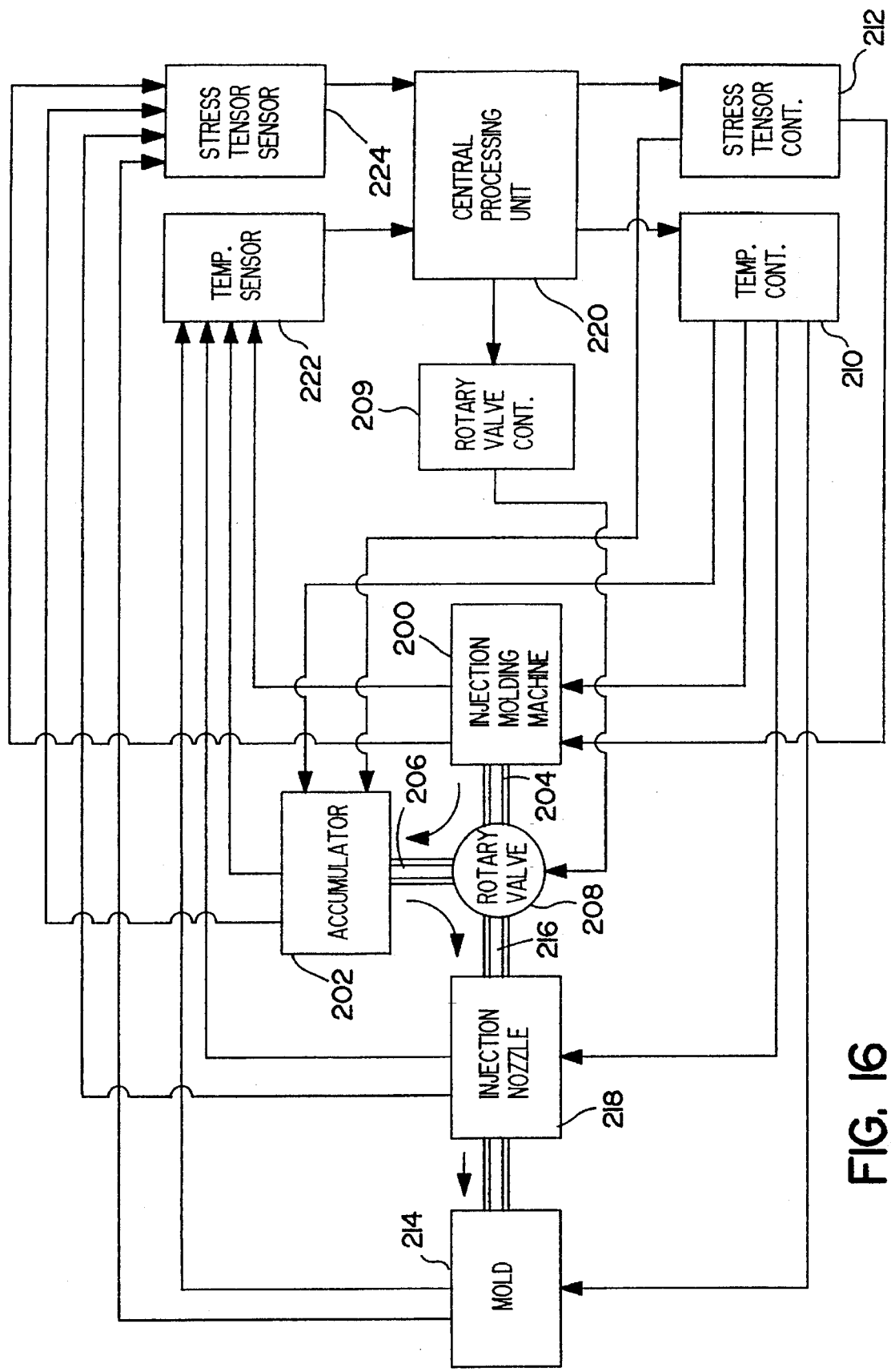
FIG. 16 is a schematic illustration of a block diagram showing a process control loop for practicing one specific embodiment of the present invention.

FIG. 16 illustrates one method of controlling the reciprocation and temperature patterns and monitoring their effect in accordance with the present invention. In FIG. 16, the feeder is injection molding machine 200. In addition to preparing and feeding a molten, moldable material into accumulator 202 via flow channels 204 and 206, and rotary valve 208, injection machine 200 is also designed to exert a stress tensor on the molten, moldable material contained therein, as well as to control the material's temperature pattern.

The rotation of rotary valve 208 is controlled by rotary valve controller 209. Moreover, the compressive force, shear stress and/or stress tensor exerted on the molten, moldable material contained within injection machine 200 is controlled by stress tensor controller 210; and the temperature of the molten, moldable material contained within injection machine 200 is controlled by temperature controller 212.

Accumulator 202 is designed to feed a molten, moldable material into mold 214 via flow channels 206 and 216, rotary valve 208, and injection nozzle 218. Moreover, accumulator 202 is also designed to exert a stress tensor on the molten, moldable material contained therein, as well as to control the material's temperature pattern.

The compressive force, shear stress and/or stress tensor exerted on the molten, moldable material contained within accumulator 202 is controlled by stress tensor controller 210. Moreover, the temperature of the molten, moldable material contained within accumulator 202 is controlled by temperature controller 212.

Injection nozzle 218 and mold 214 are both designed to control the temperature of the molten, moldable material contained therein and/or passing therethrough. This is achieved by interfacing injection nozzle 218 and mold 214 with temperature controller 210.

Temperature controller 210 can be a single device which controls the temperature of the material contained within and/or passing through injection machine 200, accumulator 202, injection nozzle 218 and mold 214, either collectively or through a series of devices which make these temperature adjustments independently. For sake of simplicity, FIG. 15 represents the temperature adjusting device as a single unit referred to as temperature controller 210. However, it is to be understood that the temperature patterns within injection machine 200, accumulator 202, injection nozzle 218 and mold 214 will almost always be different.

Temperature controller 210 can be used to increase, decrease or maintain a constant temperature within injection machine 200, accumulator 202, injection nozzle 218 and/or mold 214. This temperature control can be accomplished by any suitable means known to those skilled in the art. For example, temperature controller 210 can employ the implementation of the following: (a) hot and cold oil circulated through passages in injection machine 200, accumulator 202, injection nozzle 218 and/or mold 214, (b) resistance cartridges positioned within injection machine 200, accumulator 202, injection nozzle 218 and/or mold 214, (c) hot pipes inserted into injection machine 200, accumulator 202, injection nozzle 218 and mold 214, and/or (d) fluid which is embedded in injection machine 200, accumulator 202, injection nozzle 218 and/or mold 214 and whose temperature can be controlled by dielectric means.

Stress tensor controller 212 can also be a single device which controls the compressive force, shear stress and/or stress tensor exerted on the material contained within and/or passing through injection machine 200, accumulator 202, injection nozzle 218 and mold 214, either collectively or through a series of devices which make these pressure exertion adjustments independently. For sake of simplicity, FIG. 16 represents the pressure exertion adjusting device as a single unit referred to as stress tensor controller 212. However, it is to be understood that the reciprocation patterns within injection machine 200, accumulator 202, injection nozzle 218 and mold 214 which generate the stress tensor exerted on the material contained therein and/or passing therethrough will generally be different.

Stress tensor controller 212 can be used to increase, decrease or maintain a constant compressive force, shear stress and/or stress tensor within injection machine 200, accumulator 202, injection nozzle 218 and/or mold 214. This stress tensor control can be accomplished by any suitable means known to those skilled in the art. For example, if injection molding machine 200 and accumulator 202 contain a reciprocation device, stress tensor controller 212 can manipulate the reciprocation patterns of the reciprocation devices' drivable members. On the other hand, if injection molding machine 200 and accumulator 202 do not contain reciprocation devices, such devices could be an integral part of stress tensor controller 212. The preferred manner of controlling the compressive force, shear stress and/or stress tensor exerted on the molten, moldable material contained within and/or passing through injection molding machine 200 and accumulator 202 will depend, in part, upon the type(s) of reciprocating device(s) employed, whether the reciprocating device(s) is an integral part of injection molding machine 200 and accumulator 202 or an integral part of stress tensor controller 212, and the like.

Central Processing Unit (CPU) 220 is connected to rotary valve controller 209, temperature controller 210 and stress tensor controller 212. It should be noted that controllers 209, 210 and/or 212 can also be an integral part of CPU 220 as opposed to separate units.

Preferably, CPU 220 has programmed therein a profile of various reciprocation patterns which should occur in injection molding machine 200, accumulator 202, injection nozzle 218 and/or mold 214 in order to produce a final molded product with a specific morphological structure and/or physical properties. CPU 220 also has programmed therein a profile of various temperature patterns which should occur in injection molding machine 200, accumulator 202, injection nozzle 218 and/or mold 214 in order to produce a final molded product with a specific morphological structure and/or physical properties when the molten, moldable material is subjected to a specific reciprocation pattern.

Accordingly, by inputting into CPU 220 the desired structure and/or properties of the final product, CPU 220 will send the appropriate signals to stress tensor controller 212 which manipulates reciprocation devices in order to control the compressive force, shear stress and/or stress tensor exerted on the material contained within and/or passing through injection molding machine 200, accumulator 202, injection nozzle 218 and/or mold 214, CPU 220 also sends the appropriate signals to temperature controller 210 which manipulates temperature adjusters in order to control the temperature of the material contained within and/or passing through injection molding machine 200, accumulator 202, injection nozzle 218 and/or mold 214.

In order to monitor the temperature and compressive force, shear stress and/or stress tensor exerted on the material contained within injection molding machine 200, accumulator 202, injection nozzle 218 and/or mold 214, these units are interfaced with temperature sensor 222 and stress tensor sensor 224. These sensors are, in turn, connected to CPU 220.

Temperature sensor 222 can be a single device which senses the temperature of the material contained within and/or passing through injection machine 200, accumulator 202, injection nozzle 218 and mold 214, either collectively or through a series of devices which monitor these temperatures independently. For sake of simplicity, FIG. 16 represents the temperature sensing device as a single unit referred to as temperature sensor 222.

Stress tensor sensor 224 can also be a single device which senses the compressive force, shear stress and/or stress tensor exerted on the material contained within and/or passing through injection machine 200, accumulator 202, injection nozzle 218 and mold 214, either collectively or through a series of devices which sense these pressure exertion parameters independently. For sake of simplicity, FIG. 16 represents the pressure sensing device as a single unit referred to as stress tensor sensor 224.

Stress tensor sensors 224 can be designed to monitor any desirable pressure-related processing parameter such as compressive force, shear stress and/or stress tensor. Similarly, temperature sensor 222 can be designed to monitor any desirable temperature-related processing parameter. Moreover, similar sensors can be placed anywhere along the flow path of the molten, moldable material.

When practicing this invention, proper seals should be used such that molten, moldable material and/or driving fluids (e.g., hydraulic fluids) do not leak therethrough. The preferred seals depend, in part, upon the molten, moldable material being molded, the specific feeder, accumulator, manifold, and mold being employed, the maximum temperature and pressure ranges which the seals will be subjected to during the molding process, and the like. For most commercial practices, the seals should be able to withstand at least the following: pressures up to about 20,000 psi, temperatures up to about 1,000° F., vibration frequencies up to about 120 Hz, and the abrasive, corrosive and/or erosive properties of the molten, moldable material.

As can be seen from the above, the present invention provides specific apparatuses and/or methods for modifying the physical and physicochemical characteristics of a molten, moldable material which comprises controlling the rate of a rate sensitive change of physical state of the material from an equilibrium state to a non-equilibrium state by simultaneously varying, as a function of time, temperature and at least two theological parameters. The rates of change of these rheological parameters with time are controlled in accordance with a predetermined relationship to achieve an end product of prescribed physical and/or physicochemical characteristics. At least one of the rheological parameters being varied is compressive force, shear stress and/or stress tensor.

In varying the temperature and at least one of the other rheological variables, the moldable material passes through a rate sensitive transition involving a change of physical state such as between a solid, pasty or molten (liquid) state and a solid state. This phase transition is rate sensitive which means crossing it at a given speed would result in a specific non-equilibrium state.

The apparatuses disclosed herein are especially useful when transforming the physical characteristics of a material by controlling the influence of theological parameters as indicated in U.S. Pat. No. 4,469,649.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. An apparatus for molding and modifying the physical properties of a molten, moldable material, said apparatus comprising:
   (a) a mold defining a mold cavity, said mold comprises an inlet through which a molten, moldable material can pass into or pass through the mold cavity,
   (b) a feeder for preparing a molten, moldable material, said feeder comprises:
      (i) an outlet through which molten, moldable material can pass, and
      (ii) a means for expelling a molten, moldable material through the feeder's outlet,
   (c) a first accumulator spaced from said feeder and said mold, said first accumulator comprises:
      (i) an inlet conduit through which molten, moldable material can pass from said feeder outlet to said first accumulator,
      (ii) an outlet conduit through which molten, moldable material can pass from said first accumulator to said mold inlet, and, a means for expelling a molten, moldable material through the first accumulator's outlet,
      (iii) a means for expelling a molten, moldable material through the tint accumulator's outlet, and
      (iv) a means for exerting one of a shear stress, compressive force and a stress tensor on a molten, moldable material contained within the first accumulator or within or through the mold cavity,
   (d) a second accumulator spaced from said feeder and said mold, said second accumulator comprises:
      (i) an inlet conduit through which molten, moldable material can pass from said feeder outlet to said second accumulator,
      (ii) an outlet conduit through which molten, moldable material can pass from said second accumulator to said mold inlet, and, a means for expelling a molten, moldable material through the second accumulator's outlet,
      (iii) a means for expelling a molten, moldable material through the second accumulator's outlet, and
      (iv) a means for exerting one of a shear stress, compressive force and a stress tensor on a molten, moldable material contained within the second accumulator or within or through the mold cavity,
   (e) a manifold interposed between said mold, feeder first accumulator and second accumulator, said manifold having flow channels therethrough which are in fluid communication with said mold inlet, feeder outlet, first accumulator inlet, first accumulator outlet, second accumulator inlet and second accumulator outlet,
   (f) a flow control means positioned within the manifold, said flow control means being design to prevent the flow of molten, moldable material from the fast accumulator or the second accumulator back into the feeder,
   (g) a means for controlling the temperature of a molten, moldable material contained within one of the first accumulator, the second accumulator, and the mold cavity, and
   (h) a means for monitoring the temperature of a molten, moldable material contained within one of the first accumulator, the second accumulator and the mold cavity.

2. An apparatus as recited in claim 1 wherein said flow control means comprises a valve mechanism being movable from a first position to a second position, said valve mechanism having flow channels therethrough such that,
   (a) when said valve is in its first position, said feeder outlet is in fluid communication with said first accumulator inlet, said feeder outlet is not in fluid communication with said second accumulator inlet, said first accumulator outlet is not in fluid communication with said mold inlet, and said second accumulator outlet is in fluid communication with said mold inlet, and
   (b) when said valve is in its second position, said first accumulator outlet is in fluid communication with said mold inlet, said first accumulator inlet is not in fluid communication with said feeder outlet, said second accumulator outlet is not in fluid communication with said mold inlet, and said second accumulator inlet is in fluid communication with said feeder outlet.

3. An apparatus as recited in claim 2 wherein said valve is further movable to an intermediate position which is between said valve first position and said valve second position, when said valve is in its intermediate position,
   (a) neither said first accumulator inlet nor said first accumulator outlet are in fluid communication with any of said feeder outlet and said mold inlet, and
   (b) neither said second accumulator inlet nor said second accumulator outlet are in fluid communication with any of said feeder-outlet and said mold inlet.

4. An apparatus as recited in claim 1 wherein said flow control means comprises a one-way check valve mechanism.

5. An apparatus as recited in claim 1 further comprising means for monitoring and means for controlling the following parameters:
   (a) the temperature of any molten, moldable material contained within said feeder,
   (b) the amount of molten, moldable material introduced into said first accumulator from said feeder when said movable valve is in its first position, (c) the shear stress or stress tensor compress lye force exerted on any molten, moldable material contained within said first accumulator, (d) the amount of molten, moldable material introduced into said mold cavity from said first accumulator when said movable valve is in its second position, (e) the shear stress, compressive force or stress tensor exerted on any molten, moldable material contained within said mold cavity, (f) the mount of molten, moldable material introduced into said second accumulator from said feeder when said movable valve is in its second position, (g) the shear stress, compressive force or stress tensor exerted on any molten, moldable material contained within said second accumulator, and (h) the amount of molten, moldable material introduced into said mold cavity from said second accumulator when said movable valve is in its first position.

6. An apparatus as recited in claim 5 wherein said means for monitoring and said means for controlling the parameters identified in paragraphs (a)–(h) comprise: a central processing unit, temperature sensors interfaced with apparatus and said central processing unit, and pressure sensors interfaced with said apparatus and said central processing unit.

7. An apparatus as recited in claim 1 which further comprises a plurality of feeders.

* * * * *